(12) United States Patent
Chapman

(10) Patent No.: US 8,033,742 B1
(45) Date of Patent: Oct. 11, 2011

(54) TELESCOPING CAMERA CRANE

(75) Inventor: Leonard T. Chapman, North Hollywood, CA (US)

(73) Assignee: Chapman/Leonard Studio Equipment, Inc., North Hollywood, CA (US)

( * ) Notice: Subject to any disclaimer, the term of this patent is extended or adjusted under 35 U.S.C. 154(b) by 0 days.

(21) Appl. No.: 12/761,199

(22) Filed: Apr. 15, 2010

(51) Int. Cl.
*G03B 17/00* (2006.01)

(52) U.S. Cl. .......................... 396/428; 352/243

(58) Field of Classification Search .................. 396/428; 352/243
See application file for complete search history.

(56) References Cited

U.S. PATENT DOCUMENTS

| | | |
|---|---|---|
| 2,156,862 A | 5/1939 | Maugard |
| 2,472,944 A | 6/1949 | Furer et al. |
| 3,434,025 A | 3/1969 | Parkinson et al. |
| 4,657,220 A | 4/1987 | Lindsay |
| 4,907,768 A | 3/1990 | Masseron et al. |
| 4,943,019 A | 7/1990 | Mester |
| 4,952,953 A | 8/1990 | Ridderstolpe et al. |
| 5,047,703 A | 9/1991 | Akamatsu |
| 5,697,757 A | 12/1997 | Lindsay |
| 5,729,100 A | 3/1998 | Rothstein et al. |
| 5,768,648 A | 6/1998 | Skipp et al. |
| 5,781,814 A | 7/1998 | Chapman |
| 5,856,862 A | 1/1999 | Kokush |
| 6,450,706 B1 | 9/2002 | Chapman |
| 6,478,427 B1 | 11/2002 | Morris et al. |
| 6,752,541 B1 | 6/2004 | Dykyj |
| 6,776,488 B2 | 8/2004 | Burbulla |
| 7,101,045 B2 * | 9/2006 | Romanoff et al. ............ 352/243 |
| D539,827 S * | 4/2007 | Ebeid ........................ D16/242 |
| 7,453,176 B2 * | 11/2008 | Davison ...................... 310/75 R |
| 7,854,555 B2 | 12/2010 | Chapman |
| 2003/0161622 A1 | 8/2003 | Zantos |
| 2007/0230947 A1 | 10/2007 | Chapman |

FOREIGN PATENT DOCUMENTS

| | | |
|---|---|---|
| DE | 3628782 A1 | 3/1998 |
| EP | 1298087 A1 | 4/2003 |
| GB | 2207109 A | 1/1989 |
| JP | 08-068493 | 12/1996 |
| WO | 8910894 A | 11/1989 |
| WO | 9412424 A | 6/1994 |

OTHER PUBLICATIONS

Technovision USA, Inc., Techno Crane Brochure, Sep. 1986.
Orion Technocrane, Super Techno Crane Brochure, Sep. 1986.
United States Patent and Trademark Office, International Search Report and Written Opinion for PCT/US2010/044792, mailed Sep. 23, 2010.
EPC Communication pursuant to Article 94(3) EPC issued in application No. 05 724 101.0-2209 on Feb. 15, 2010.

* cited by examiner

*Primary Examiner* — Rodney Fuller
(74) *Attorney, Agent, or Firm* — Kenneth H. Ohriner; Perkins Coie LLP

(57) ABSTRACT

A camera crane includes an arm having a back section, a middle section telescopically extendible into and out of the back section, and a front section telescopically extendible into and out of the middle section. A camera platform is pivotally attached at or near the front end of the front section. A counterweight is movable along the back section. An arm support can support the back section at two or more positions. Consequently the pivot axis of the arm can be shifted to the front or rear, to change rear clearance requirements, counterweight requirements, and the reach of the arm. An electronic controller is linked to a motor and a sensor on a camera head, with the motor acting to keep the head level.

12 Claims, 23 Drawing Sheets

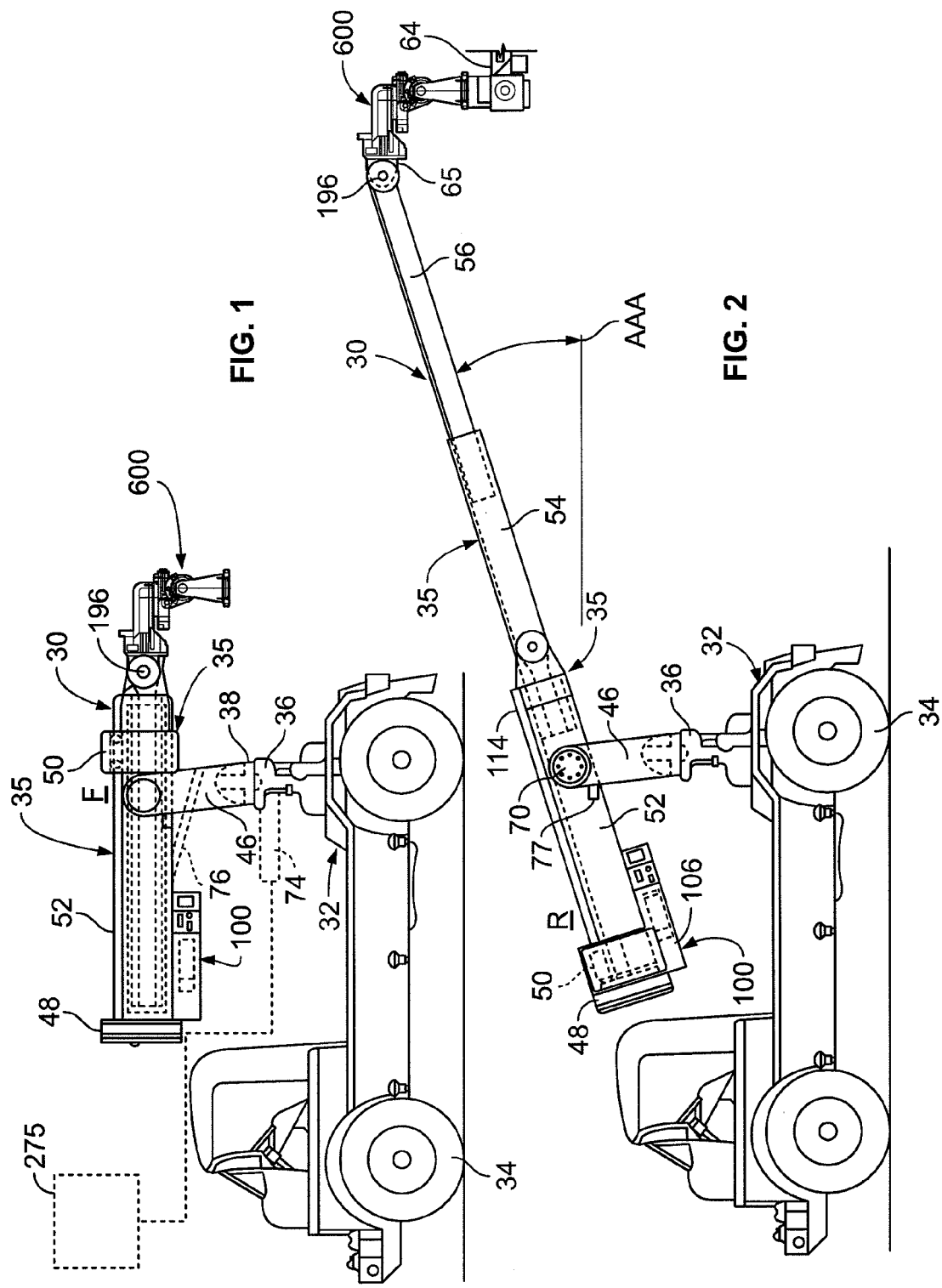

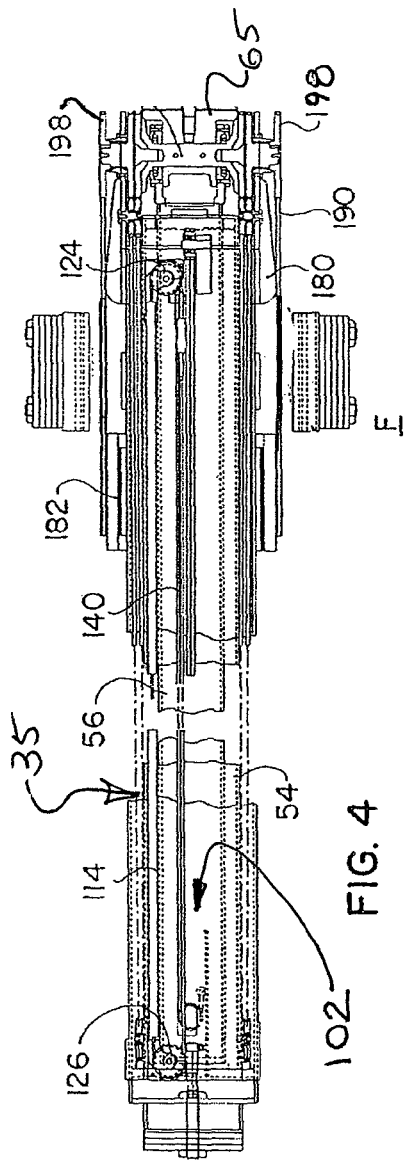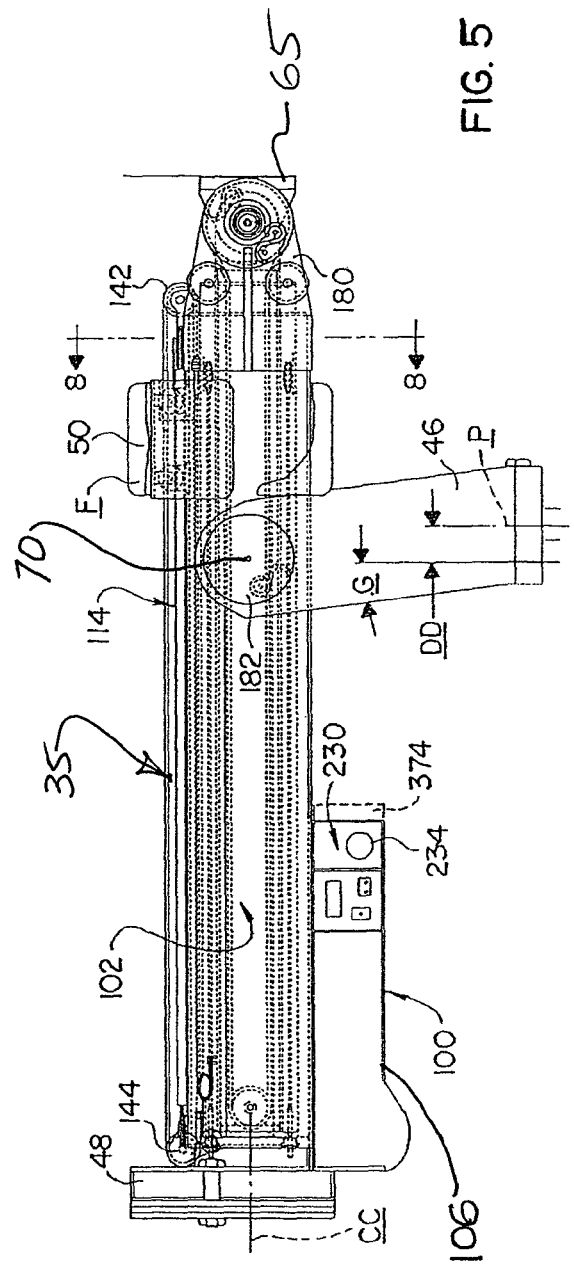

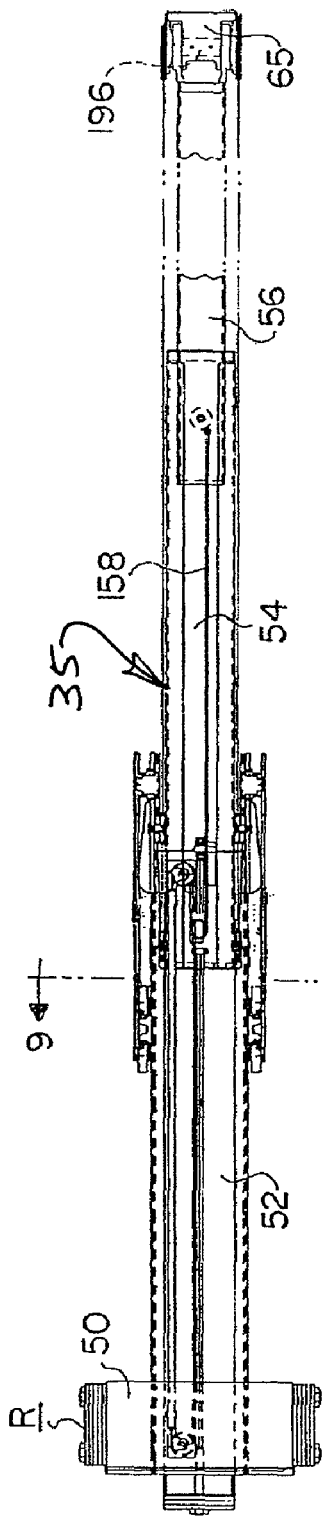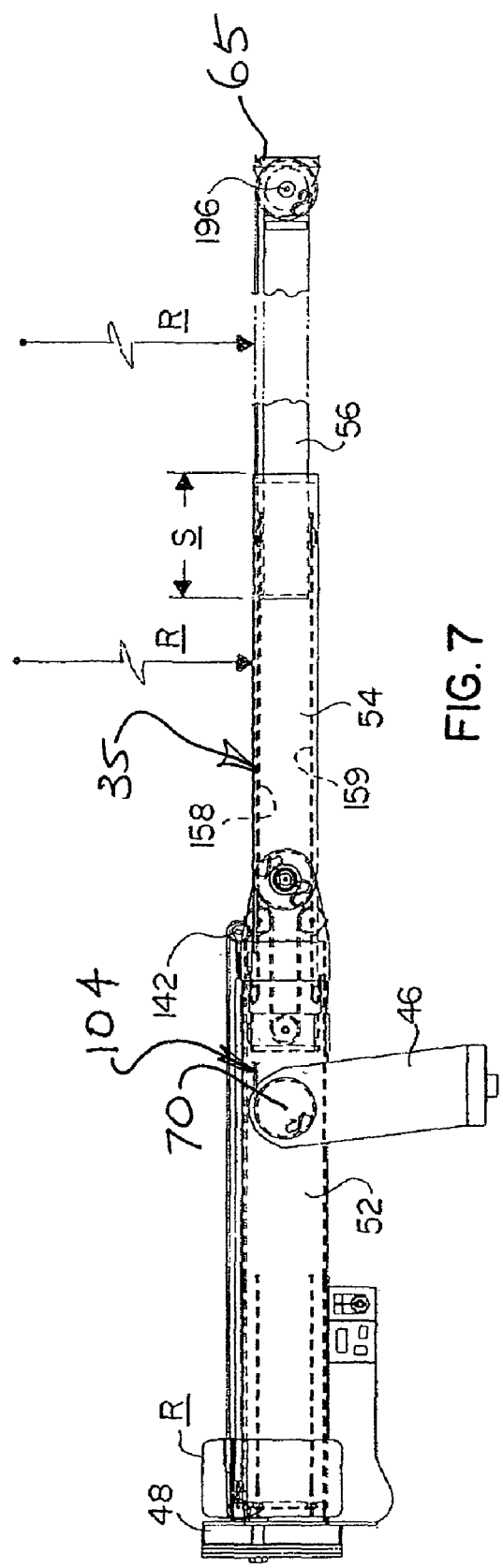

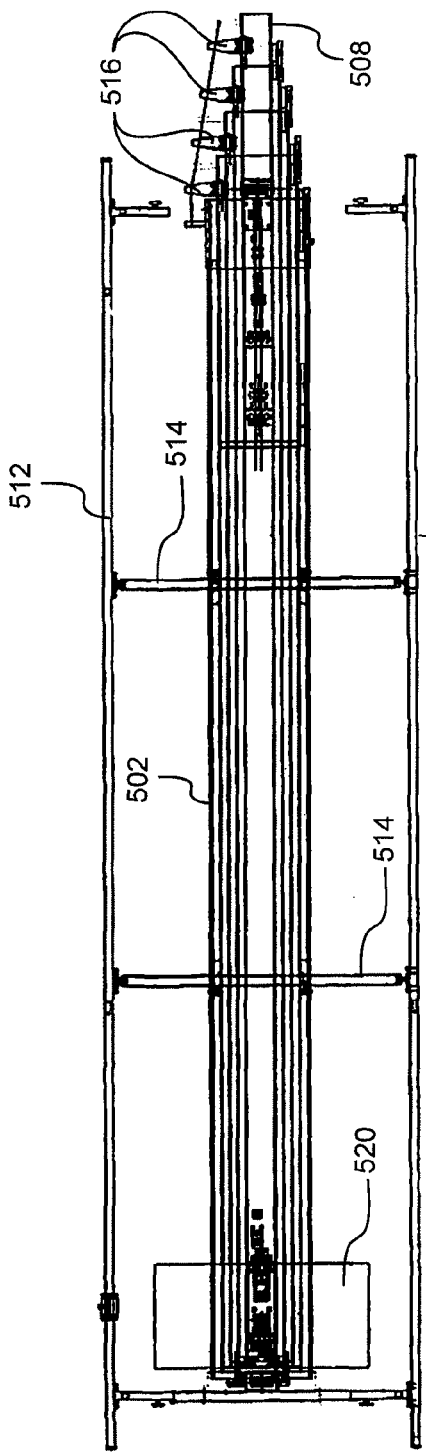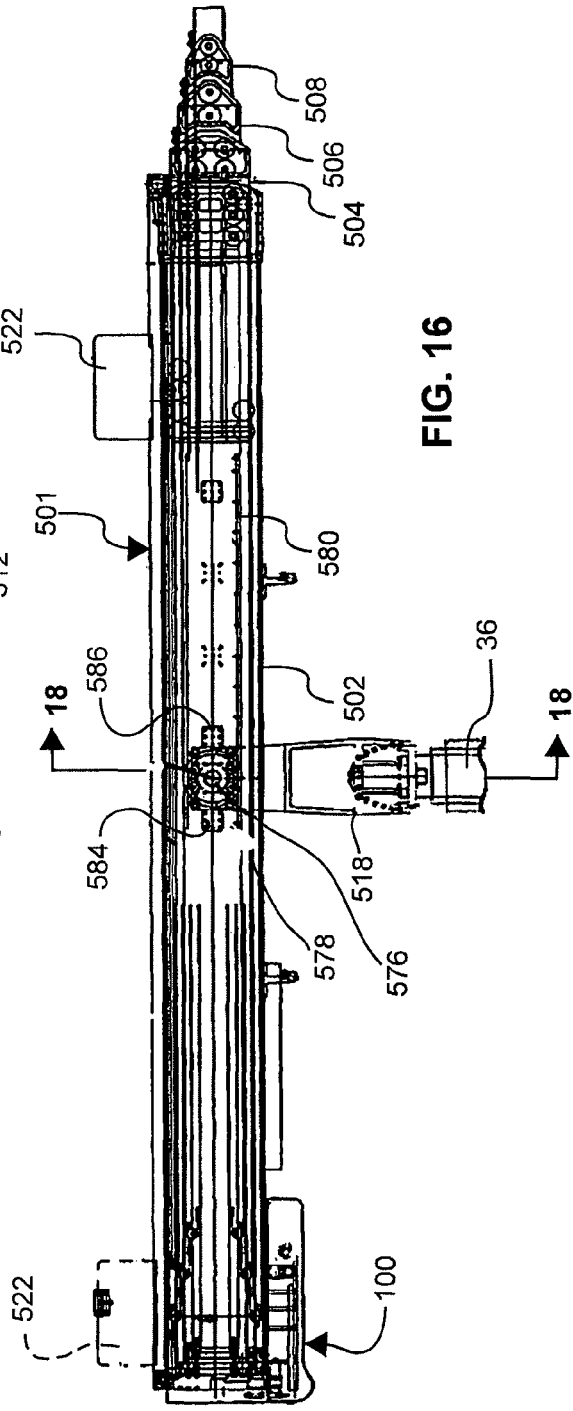

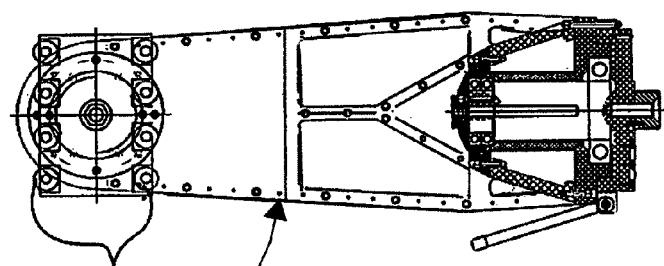
FIG. 34
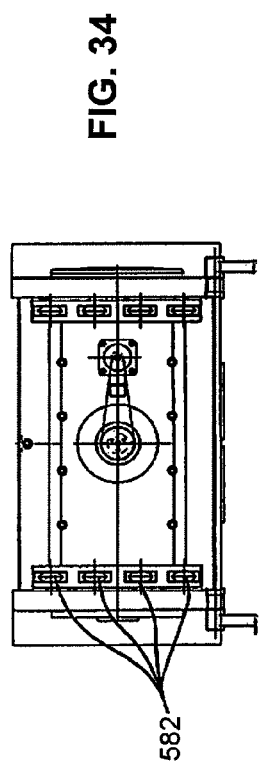
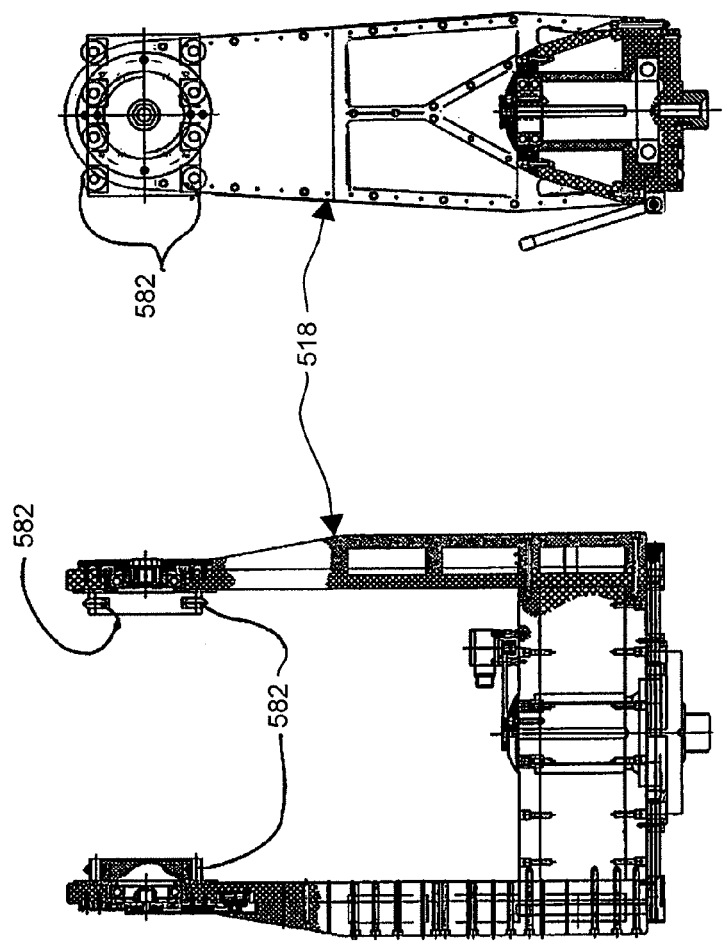
FIG. 33
FIG. 32

TELESCOPING CAMERA CRANE

BACKGROUND

The field of the invention is camera cranes. Camera cranes are often used in motion picture and television production. The motion picture or television camera is typically mounted on a crane arm supported on a mobile base, dolly, or truck. Camera cranes generally have a crane arm supported on a base, with a camera platform at one end of the arm, and a counter weight at the other end. The crane arm can be pivoted by hand to raise and lower the camera, and also to pan to the left or right side.

With the development of high definition digital television cameras, 3-D digital and automated digital and film cameras, recording or filming can be achieved without a camera operator behind the camera. Rather, the camera may be remotely-controlled with the camera operator monitoring the image captured by the camera via a remote monitor. This allows for more versatile camera positioning. For example, a camera may be supported at the end of a camera crane arm in positions not accessible with a camera operator behind the camera.

Due to the variety of filming, TV or video locations (collecting referred to here simply as filming), the camera crane arm should advantageously be portable and lightweight. On the other hand, the arm must be rigid enough, when assembled, to resist bending and sagging, and to avoid excessive whipping motion of the camera during crane arm movement.

Telescoping camera cranes have a telescoping arm that can extend and retract, providing far more capability than fixed length crane arms. However, telescoping cranes have typically been limited to a reach of about 50 feet. Moreover, under certain conditions, telescoping cranes can cause unintended or undesirable camera movements, due to bending, flexing, twisting, or vibration of the crane arm. Noise generated from moving parts in these types of cranes, when the arm is extended or retracted, can also disrupt filming or recording.

Accordingly, various engineering challenges remain in designing an improved camera crane.

SUMMARY OF THE INVENTION

After extensive research and development by the inventor, a novel telescoping camera crane is provided with various new features and advantages. In a first aspect, a camera crane includes an arm having a back section, a middle section telescopically extendible into and out of the back section, and a front section telescopically extendible into and out of the middle section. A camera platform is pivotally attached at or near the front end of the front section. A counterweight is movable along the back section. An arm support can support the back section at two or more different longitudinal positions. Consequently the pivot axis of the arm can be shifted front-to-back, along a longitudinal axis of the arm, to change rear clearance requirements, counterweight requirements, and the reach of the arm.

In a second aspect, a camera crane arm includes a telescopic arm made up of four or five telescoping sections. A cable and pulley system associated with the sections telescopically extends and retracts the sections. A counter weight tray is movable along the first section and is linked to the cable and pulley system. A hydraulic drive system drives the counter weight tray which in turn drives the cable and pulley system. A nose assembly at the front end of the crane arm includes a leveling system to keep the camera platform level.

Other aspects and advantages will be apparent from the following detailed description and drawings. The invention relies as well in subcombinations and subsystems of the elements described. For example, each of the features listed above can be used as an improvement in a conventional crane design. Alternatively, they may be used in various combinations with each other.

BRIEF DESCRIPTION OF THE DRAWINGS

In the drawings, wherein the same reference number indicates the same element in each of the views:

FIG. 1 is a side view of a telescoping crane, mounted on a mobile base or vehicle, with the crane in the retracted position.

FIG. 2 is a side view of the crane shown in FIG. 1, with the arm fully extended.

FIG. 4 is a top view of the crane arm shown in FIG. 5.

FIG. 5 is an enlarged side view of the crane arm shown in FIG. 1.

FIG. 6 is a plan view of the crane arm in the fully extended position.

FIG. 7 is a side view thereof.

FIG. 16 is a side view of the crane in a retracted position.

FIG. 17 is a top view of the crane shown in FIG. 16.

In FIGS. 24 A and 24B, the right side R of the view shows the roller arrangement at the front end of the crane arm tubes, and the left side L of the view shows the roller arrangement at the back end of the crane arm tubes.

FIG. 32 is front view of the U-frame shown in FIG. 25.

FIG. 33 is side view of the U-frame shown in FIG. 33.

FIG. 34 is a top view of the U-frame shown in FIG. 33.

DETAILED DESCRIPTION OF THE DRAWINGS

Figure 3:
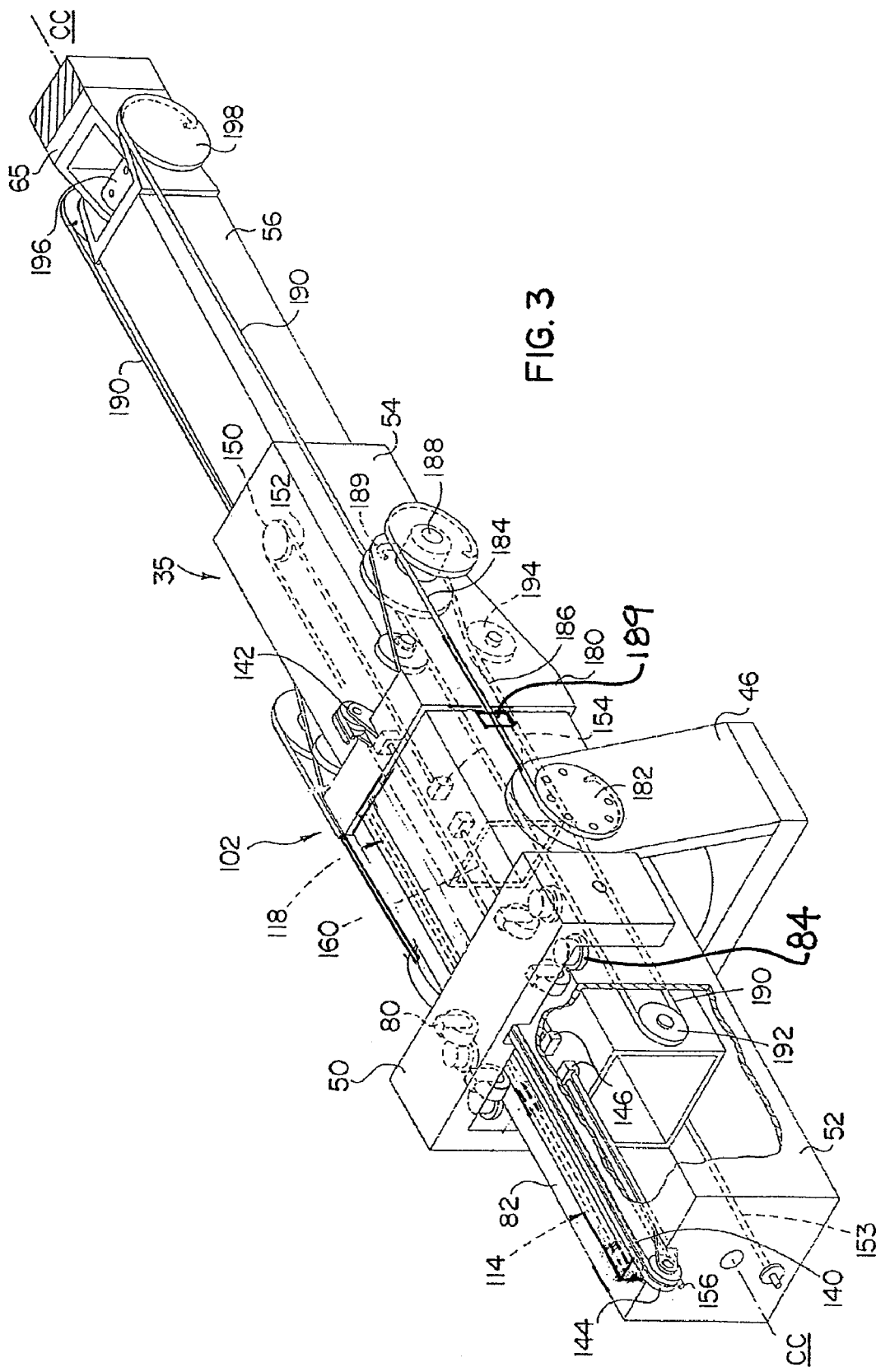
FIG. 3 is a perspective view showing various components of the crane arm shown in FIGS. 1 and 2.

Turning now in detail to the drawings, as shown in FIGS. 1 and 2, a telescoping crane 30 is mounted onto a mobile base 32. The mobile base 32 may be a truck or road vehicle, or a motorized special purpose camera crane base or dolly. Typically, the mobile base 32 will have wheels 34 which drive and steer the mobile base. Four-wheel drive and four-wheel steering may be provided. For smaller scale cranes 30, e.g., up to about 15 feet, the mobile base 32 may be unmotorized, and may be moved or pushed by hand. For larger versions of the telescoping crane 30, or when required due to ground conditions or other use requirements, the mobile base 32 can have electric motors, or internal combustion engines, for driving the wheels 34.

As shown in FIGS. 1 and 2, the crane 30 is mounted on a column 36 on the mobile base 32. The column 36 may be automatically leveled, as described in U.S. Pat. No. 4,747,424, to maintain the crane 36 in a level orientation as the mobile base 32 moves over uneven ground.

Figure 8:
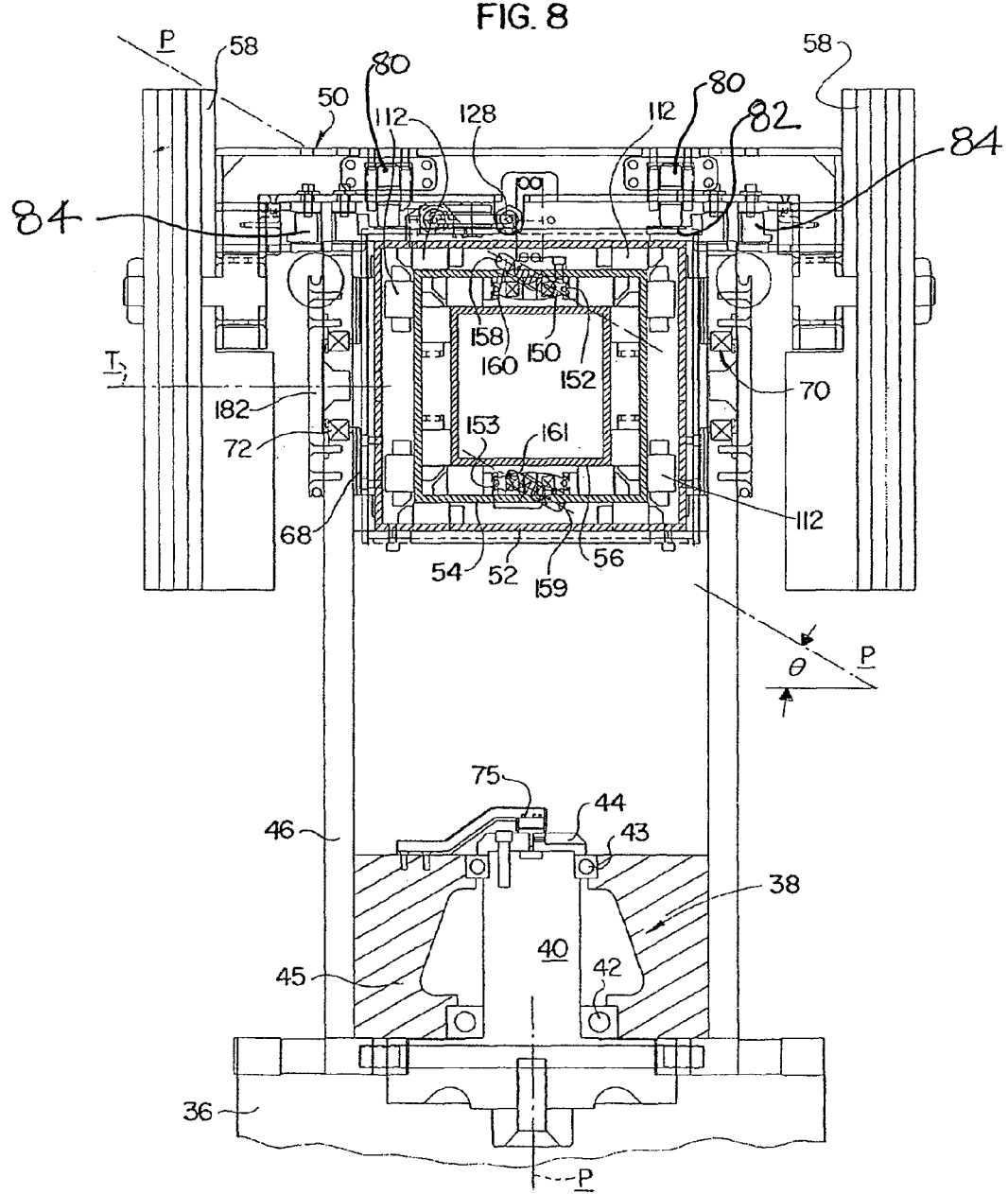
FIG. 8 is a section view taken along line 8-8 of FIG. 5.

A U-shaped center post of frame 46 is rotatably mounted on the column 36. As shown in FIG. 8, a post 40 on the column 36 extends up through a lower column bearing 42, and upper column bearing 43 secured within a post ring 45 of the center post 46. A cap nut 44 is attached, e.g., threaded, onto the top end of the column post 40, to securely attach the center post 46 onto the column 36 of the mobile base 32, while still allowing the center post 46 of the crane 30 to rotate. As shown in FIGS. 2, and 8, a crane arm 35 is supported on a tilt axle 70 which is pivotably supported on the center post 46. Consequently, the crane arm 35 can rotate about a pan axis P, and can also pivot about a tilt axis T shown in FIG. 8.

As shown in FIG. 5, the centerpost 46 may extend up at a rearward angle G, so that the tilt axle 70 is offset behind the pan axis P by a distance DD. This offset, which helps to keep the center of gravity of the arm 35 centered over the pan axis bearings 42 and 43, varies with the arm design, and typically is 1-3 inches. The corresponding angle G is generally 5-15 degrees. An optional potentiometer or angular position sensor may have a base attached to the fixed or non-rotating column post 40, and a body linked to and rotatable with the center post 46, to provide an electrical output signal to a controller, such as a control box 275 shown in FIG. 1.

Referring to FIGS. 1-8, the crane arm 35 includes a first or outer section 52, a second or middle section 54, and a third or inner section 56. As shown in FIG. 8, the first section 52 is supported on the tilt axle 70 via an axle bearing 72. Fixed or non-moving trim weights 48 are placed at the back end of the first section 52. The trim weights 48 may or may not be needed or used, depending on whether non-moving weight from e.g., accessories, is added to the arm in front of the tilt axle.

A counter weight carrier or tray 50 is movable along the top of the first section 52, from a front or forward position F, when the arm 35 is fully retracted, as shown in FIGS. 1, 4, and 5, to a rear or back position R, when the arm 35 is fully extended, as shown in FIGS. 2, 6, and 7. Counter weights 58 are attached to the counter weight carrier 50. As shown in FIGS. 3 and 8, the counter weight carrier 50 has top rollers or wheels 80 which roll on a roller track 82 attached to the top surface of the first section 52. The counter weight carrier 50 also has side rollers or wheels 84 which roll along the sides of the roller track 82. The top rollers 80 support the weight of the counter weight carrier 50 and moving counter weights 58, and allow the counter weight carrier 50 to roll between the front and rear positions with low force. The side rollers 84 keep the counter weight carrier 50 aligned, side to side, on top of the first section 52, and secure the counter weight carrier vertically against upward movement.

Figure 9:
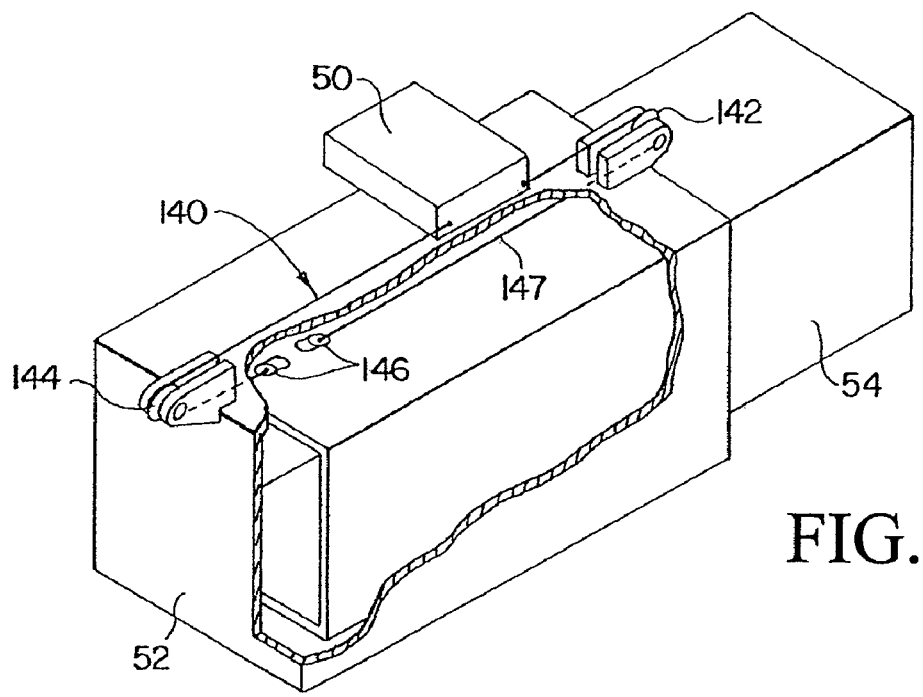
FIG. 9 is a perspective view diagram showing the second or a center section drive cable connecting the counter weight carrier and the center tube.

The crane arm 35 also includes a cable system 102, which extends and retracts the second section 54 and the third section 56 with movement of the counter weight carrier 50. Referring to FIGS. 3 and 9, a second section rear drive cable 140 (or pair of side-by-side cables) is attached to the top surface of the second section 54, via a cable tie, clamp or turnbuckle 146, adjacent to the back end of the second section 54, extends around a rear pulley 144 attached to the back end of the first section 52 and is attached near the back end of the second section 54. A second section forward drive cable 147 is attached to the counter weight carrier 50, extends forward around a front pulley 142, supported near the front end of the top surface of the first section 52, and is attached to the top surface of the second section 54, near the back end of the second section 54. Consequently, as the counter weight carrier 50 moves along the top of the first section 52, the second section 54 is moved by an equal amount, in an opposite direction. The drive system 102, as shown in FIGS. 3 and 10, also includes a top extending cable 152, and symmetrical or mirror image or bottom extending cable 153, shown in FIG. 8.

Figure 10:
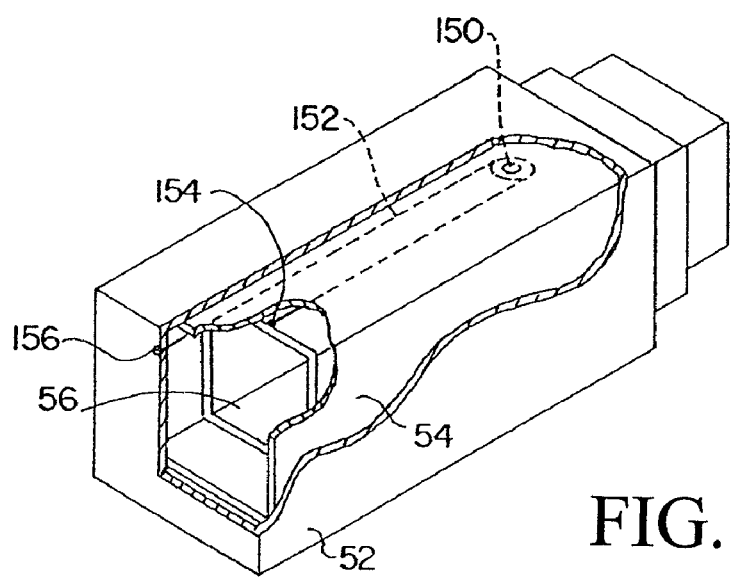
FIG. 10 is a perspective diagram showing a top extending cable.

As shown in FIG. 10, the back end of the top extending cable 152 is attached to a back wall of the first section 52 at a cable anchor or tie point 156. The top extending cable 152 extends forward, between the second section 54 and the third section 56, runs around a top drive pulley 150, secured to the inside top surface of the second section 54 and is attached at the rear top surface of the third section 56, via a cable anchor or turnbuckle 154. The top drive pulley 150 is mounted on the top inside surface of the second section 54, near the front end of the second section 54. The bottom extending cable 153 has the same design. As the second section 54 is extended out of the first section 52, via movement of the counter weight carrier 50 driven by the hydraulic cylinder 114, the drive pulleys 150 (one each on the top and bottom of the second section 54) pull the third section 56 out of the second section 54. Accordingly, rearward movement of the counter weight carrier causes the third section 56 to extend out of the second section 54 by the same amount (and in the same direction) as the second section 54 extends out of the first section 52.

Figure 11:
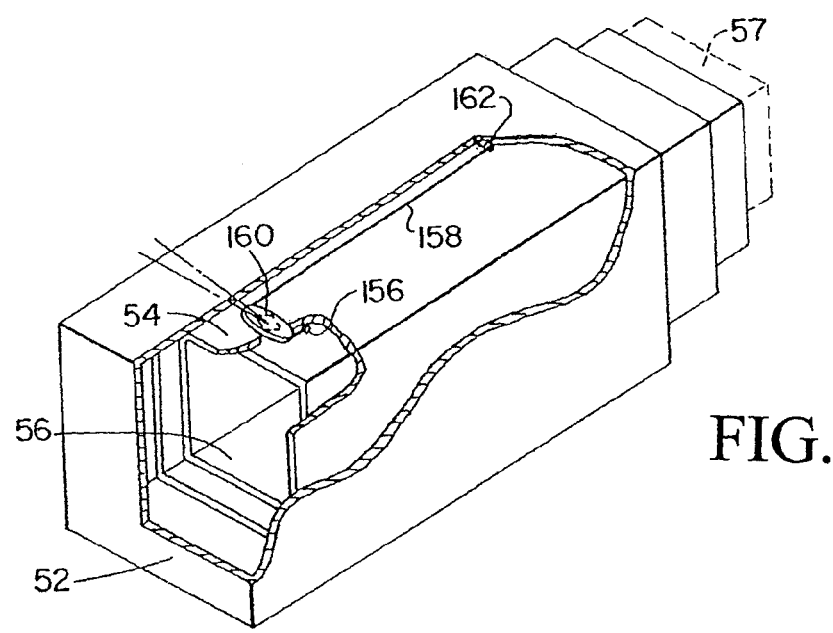
FIG. 11 is a perspective diagram showing a top retracting cable.

The drive system 102 also includes a top retraction or pull back cable 158, and a bottom retraction or pull back cable 159, as shown in FIGS. 8 and 11. Referring to FIG. 11, the first or front end of the top pull back cable 158 is attached to the top inside surface of the first section 52, with a cable anchor or turnbuckle 162. The top pull back cable 158 then extends rearwardly, between the first section 52 and the second section 54, to a retraction pulley mounted on the top back end of the second section 54. For purposes of illustration, the bottom extension and retraction cables and pulleys are not shown in FIGS. 10 and 11. However, they may be duplicates of the top cable and pulley designs shown in FIGS. 10 and 11. Top and bottom cables and pulleys are used to provide precise, smooth and more evenly balanced telescoping movement of the sections. Typically, two or more of each type of cable are used between each of the sections. However, single cable designs may also be used. Chains and sprockets may also be used in place of cables and pulleys.

The top retraction or pull back cable 158 extends around the top retraction pulley 160, passes through the slot or opening in the second section, and is attached to the top back end of the third section 56 with a cable anchor or tie 156. The bottom pull back cable 159 has the same design. Both retraction pulleys 160 and 161 are oriented in a plane P at an angle of 20-45 and preferably 30 degrees, to allow the pulleys to fit within a compact space between the second and third sections, as shown in FIG. 8. As the counter weight carrier moves forwardly, the second section 54 is retracted or pulled back into the first section 52, pulling the third section 56 back into the second section 54, via the pull back cables.

Turning momentarily to FIG. 7, with smaller versions of the crane arm 35 (e.g., having an extended length of about 15 feet, as measured from the tilt axle 70 to the nose axle 196), the moving sections 54 and 56 may be straight. For longer versions of the crane arm 35, the second and third sections 54 and 56 are advantageously formed with a slight upward radius of curvature R. The radius R will vary, depending on bending and deflection characteristics of the sections. Stiffer sections (i.e., having a shorter length, thicker walls, or greater moment of inertia) will have less curvature, i.e. R will be greater. As one example, where the second and third sections are an 8 inch and a 6 inch square aluminum tube, each about 170 inches long (i.e., for a crane arm having an extended length of about 31.5 feet), R is preferably 8,000-20,000, 10,000-18,000, or 13,000-15,000 inches. This upward curvature helps to compensate for sagging of the arm 35 when loaded. With an average payload of about 150 lbs and with arm at a 30 degree elevation angle, the upward curvature R substantially offsets the bending deflection, and the arm 35 is straight. With different payloads and elevation angles, the arm 35 will curve slightly up or down, but it will always be straighter than an arm without any upward compensating curvature R. Having the arm 35 remain straighter improves performance because it helps to keep the center of gravity of the payload centered on the central axis of the arm 35. Consequently, the arm 35 is less subject to eccentric loads or torsional loading, resulting in a more stable camera platform. In addition, the straighter arm 35 is more easily kept in balance.

Referring to FIG. 8, the first section 52, second section 54, and third section 56 are preferably square or nearly square aluminum tubes. In the design shown in the drawings, which provides an extension of travel length of approximately 112 inches, the first section is a 10×10¾ inch square tube, the second section is an approximately 8 inch square tube, and the third section is an approximately 6 inch (outside dimensions) square tube. Larger and smaller versions can of course also be made. The sections may be formed as extrusions, weldments, bolted plates, or in similar ways. Drain holes may be provided in the sections 52 and 54, to reduce buoyancy forces when they are submerged. The size, shape and number of telescoping sections, material selections, actuator (e.g., hydraulic, electric, etc.) type, attachment techniques and accessories, are not essential to the invention and can be changed.

The crane arm 35 includes a leveling system generally designated at 104 in FIG. 7, to maintain the nose plate 65, and any accessory attached to it, in a horizontal or level orientation, regardless of the elevation angle AAA (shown in FIG. 2) of the crane arm 35. The leveling system 104 consequently maintains a camera supported directly or indirectly by the nose plate 65, in a horizontal position. The leveling system 104 is further described in U.S. Pat. No. 7,128,479, incorporated herein by reference.

Figure 12:
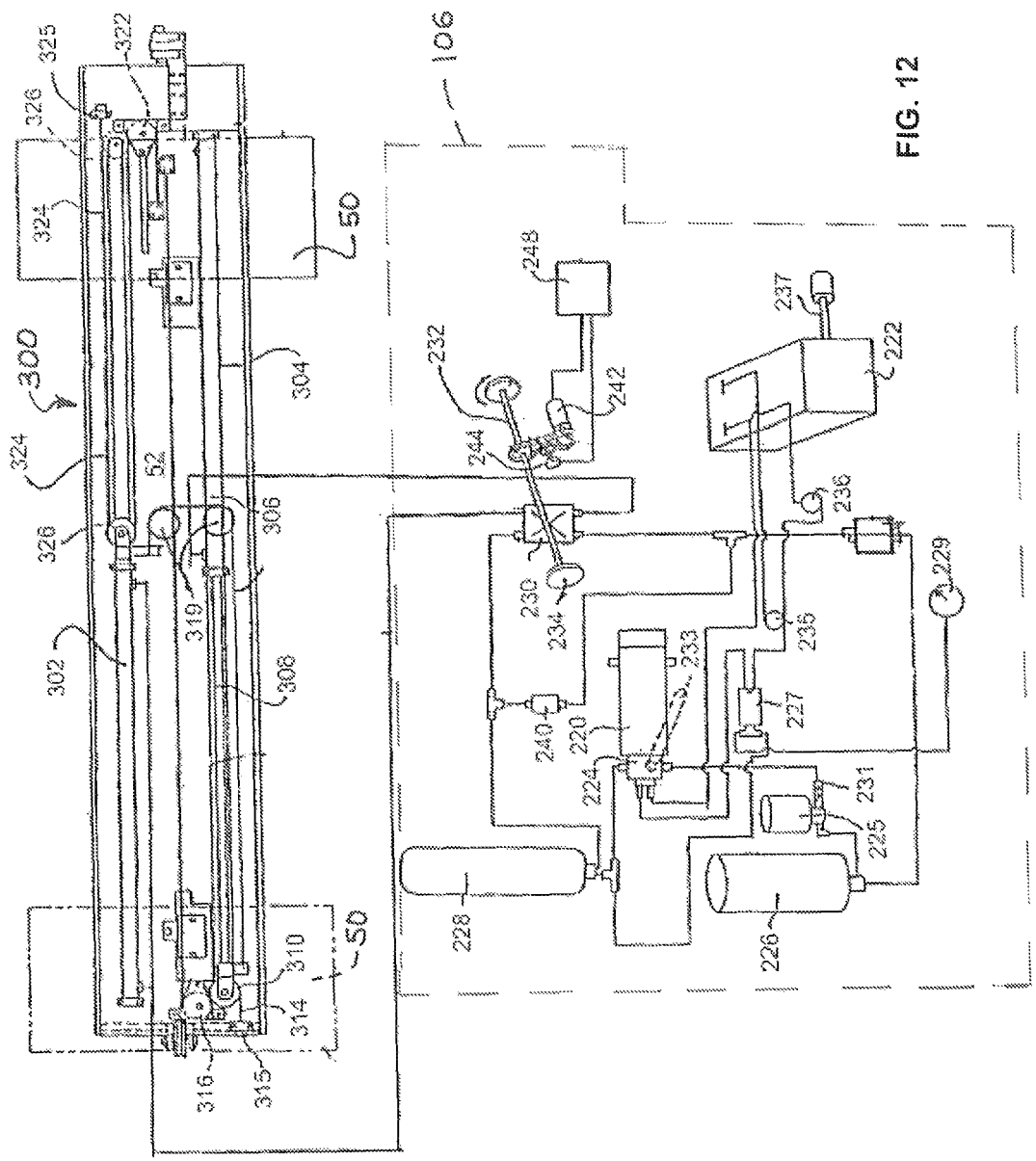
FIG. 12 is a schematic diagram showing a hydraulic system of the crane arm shown in FIGS. 1-7.
Figure 13:
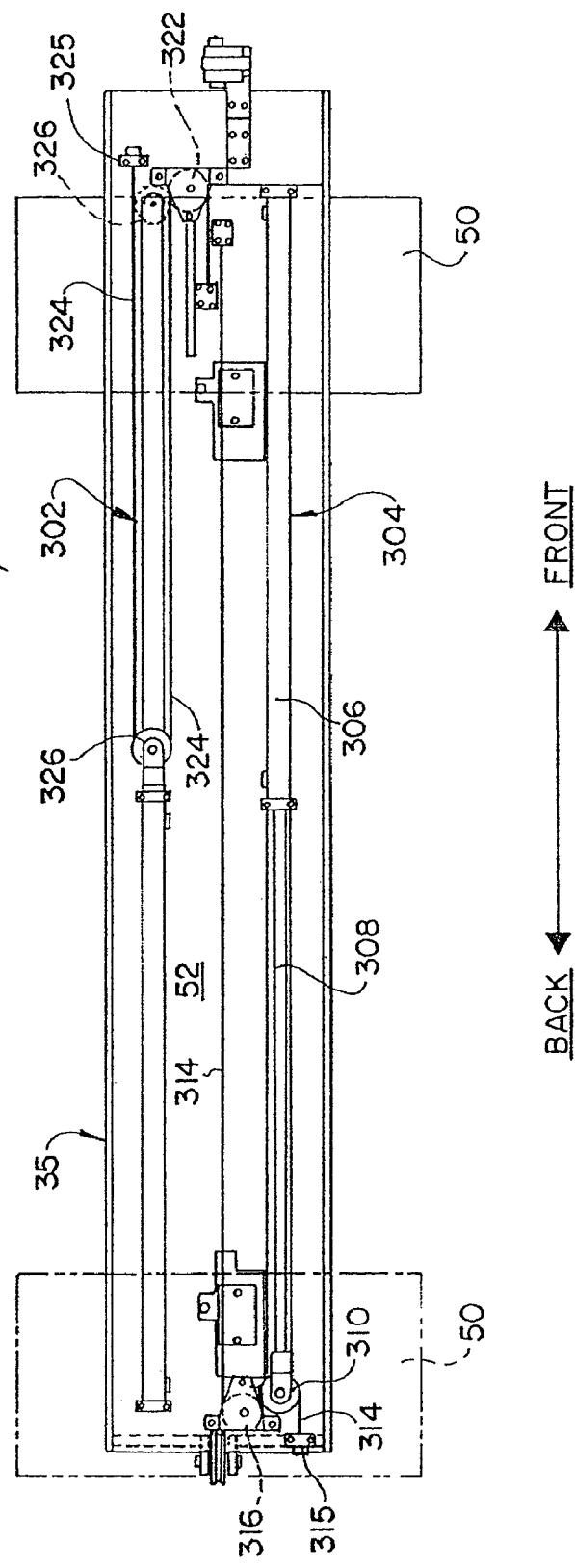
FIG. 13 is a top view of an alternative hydraulic drive system.

The counter weight carrier 50 is moved by a drive system 300 which is shown in FIGS. 12 and 13. The drive system 300 provides the motive force for moving the counter weight carrier 50 which simultaneously extends or retracts the crane arm 35. In normal operation, the crane arm 35 is balanced. Forward or upward movement of the payload is compensated by rearward or downward movement of the counter weight carrier 50 and the mobile counter weights 58. Accordingly, the drive system 300 generally need only overcome forces of friction and inertia, to extend or retract the crane arm 35. As a result, the drive system 300 may be compact and energy efficient.

FIG. 12 shows one example of a drive system 300 having a pump 224 driven by an electric motor 220 to charge or pressurize an accumulator 228. Instead of the motor 220, a hand pump 233 may be used. The battery 222 can be charged by an external AC plug-in connection 237. The accumulator 228 is connected via fluid lines to a valve assembly 230, and also to a pressure switch 227, which automatically switches off the motor 220 when a pressure limit is reached within the accumulator 228. A pressure gauge 229 linked to the accumulator 228 is visible through a window or opening in the enclosure 106. A battery 222 connects to the motor 220 through an on/off switch 236 and the pressure switch 227. A relief valve 240 joins into a T-fitting in the line linking the accumulator 228 and the valve assembly 230, to relieve excess pressure in the accumulator 228, and return hydraulic fluid to a reservoir or tank 226. The reservoir 226 provides unpressurized hydraulic fluid, through a filter 225 and a check valve 231 to the inlet of the pump 224.

A valve shaft 232 extends through the valve assembly 230. Control knobs 234 are provided at each end of the valve shaft 232, so that the valve assembly 230 can be controlled from either side of the crane arm 35. A chain or belt connects a shaft sprocket on the valve shaft 232 with a motor sprocket on a valve control motor 242. An adjustment and potentiometer idler sprocket is also engaged with the chain, and is linked to a potentiometer 244. The potentiometer 244 and the valve control motor 242 are both connected to an electronic controller 248. The potentiometer 244 has a small cable transducer attached to the counter weight carrier and provides electrical signals to the controller 248 based on position, and speed and direction of movement of the counterweight carrier, which is proportional to the extension position of the arm 30. Stops limit rotation of the valve 230. As also shown in FIG. 12, the hydraulic system may include a hydraulic shut off valve 238, as well as cable tensioning link, as described in U.S. patent application Ser. No. 12/537,200, incorporated herein by reference.

As shown in FIGS. 12 and 13, the drive system 300 has a first or retracting linear actuator 302 and a second or extending linear actuator 304. The actuators 302 and 304 may be hydraulic, electric, pneumatic or use other drive means suitable for moving the counter weight carrier 50. Non-linear actuators for moving the counterweight carrier 50 may also be used, including rotary actuators or winches acting directly to pull on a cable attached to the counterweight carrier 50. In the embodiment shown in FIG. 13, the actuators 302 and 304 are linear hydraulic actuators. While other types of actuators may be used, hydraulic actuators may be advantageous because they are quiet, precisely and relatively easily controlled, compact, reliable, and can be remotely powered via a hydraulic system located away from the actuators themselves. Hydraulic systems are also waterproof.

Referring still to FIG. 13, where the actuators are hydraulic, each of the actuators 302 and 304 has a cylinder 306 attached or fixed in place on the first section 52, and a piston or ram 308 moveable into and out of the cylinder via hydraulic power. The cylinder 306 of the first actuator 302 is attached towards the back end of the first section 52. The cylinder 306 of the second actuator 304 is attached towards the front end of the first section 52.

The first actuator 302 acts as a retraction actuator as it pulls the counterweight carrier forward (to the position shown in solid lines in FIG. 13) which causes the arm to retract, as described above with operation of the drive system 100. The second actuator 304 acts as an extension actuator as it pulls the counterweight carrier 50 rearward towards the back of the first section 52 (to the position shown in dotted lines in FIG. 13) which causes the arm to extend.

A retraction actuator pulley 326 is rotatably supported on a clevis at the end of the piston 308 of the first actuator 302. A retraction cable 324 has a first end 325 fixed or clamped near the front end of the first section 52. The retraction cable 324 runs or extends rearward from the first end 325, wraps around the pulley 326, runs forward and wraps around a forward idler pulley 322, then runs rearward and is attached to the counterweight carrier 50. The idler pulley 322 is rotatably attached to, and fixed in place on, the top surface of the first section 52, adjacent to the front end of the first section 52. As a result, when the actuator 302 retracts or pulls back, the counterweight carrier 50 is pulled forward, to the position shown in solid lines in FIG. 13. This causes the arm 30 to pull back or retract, as described above.

Symmetrical with retraction components described just above, an extension actuator pulley 310 is rotatably supported on a clevis or other fitting at the end of the piston 308 of the second actuator 304. An extension cable 314 has a first end 315 fixed or clamped near the back end of the first section 52. The extension cable 314 runs or extends forwardly from the first end 315, wraps around the pulley 310, runs rearward and wraps around a rear idler pulley 316, then runs forwardly and is attached to the counterweight carrier 50. The idler pulley 316 is rotatably attached to, and fixed in place on, the top surface of the first section 52, adjacent to the back end of the first section 52. As a result, when the actuator 304 retracts (i.e., when the piston 308 is withdrawn into the cylinder 306), the counterweight carrier 50 is pulled rearward, towards the back of the first section 52, to the position shown in dotted lines in FIG. 13. This causes the arm 30 to extend as described above relative to operation of the drive system 100.

The components making up the hydraulic system 300, which are shown in FIG. 12, are preferably contained within the hydraulic system housing 106, except for the hydraulic cylinders 302 and 306 which extend along the top surface of the first section 52. An on/off indicator 235 may be positioned to be viewable through a window or opening in the enclosure 106 around the hydraulic components shown in FIG. 12. The hydraulic control valve assembly 230 may optionally be remotely controlled, via a remote control box 275 connected to each of them via a wired or wireless connection, as shown in FIG. 1. This allows the crane arm 35 to be remotely controlled. Pan and tilt sensors 75 and 77 (shown in FIGS. 8 and 2 respectively) provide rate, direction, and/or position information to the control box 275.

In use, the crane 30 is shipped to the filming location in the retracted position. The trim weights 48, and the mobile counter weights 58, and any riser or extension or accessory, such as a remote control camera head, are preferably separated from the camera crane 30 and transported individually to make transportation easier. At the filming location any risers, drop downs, extensions or camera heads are attached to the nose plate 65. The camera and any accessories are attached to a camera platform supported on the nose plate. Mobile weights 58 are added to the weight carrier until the arm is balanced. The center of gravity CG of all of the moving elements is therefore then fixed, and remains on the pan axis P, whether the arm is extended or retracted or in between. Correspondingly, the center of gravity CG of the arm 35 also remains centered over the pan bearings 42 and 43. As a result, during panning movement, the weight load of the arm remains centered on the bearing. Deflection during panning of the center post 46, or of the frame or tires of the mobile support, is reduced or avoided entirely. This provides a more stable support for the camera. If needed, trim weights are added to precisely balance the crane arm 35. While the trim weights will typically be added at the back end of the arm, for some uses, they may also be attached near the front end of the arm.

The drive system 300 is charged, preferably by plugging wall current into the connector or plug 237 within the electrical system of the drive system 300. Alternatively, power from the battery 222, controlled by the switch 235 is used to power the motor 220 driving the pump 224. As the drive system 300 described above operates with only small volumes of hydraulic fluid, the accumulator 228 can be quickly charged. The crane 30 is then ready for use in filming. The camera 64 (shown in FIG. 2) is attached to the nose plate 65, typically on a camera head, riser, or similar accessory. The camera 64 is moved to the desired position by pivoting the crane arm 35 about the pan axis P shown in FIG. 8, and by pivoting the crane arm 35 about the tilt axis T. These pivoting movements are typically performed manually by the crane operator. As the arm 35 is balanced, little or no lifting force is required, and manual force is required only to overcome friction and inertia.

The telescoping movement of the crane arm 35 is initiated by turning the control knob 234. This actuates the valve assembly 230, supplying hydraulic fluid to the hydraulic cylinder 306 to pull the counter weight carrier 50 rearward, and in turn extend the second and third sections 54 and 56, as described above. The controller 248 can be set up or programmed to actuate the valve control motor to operate the valve assembly. This allows the crane arm 35 to automatically move to pre-selected positions, or to perform pre-programmed movements. The remote control box 275 may be similarly programmed, with positions or movements (pan, tilt, telescope extend/retract) for the entire crane arm 35.

The center of gravity CGP of the payload attached to the nose plate 65 is preferably positioned on the crane arm center line CC to reduce twisting or torsion of the crane arm 35 during rapid telescoping arm movements. Accordingly, the camera can be quickly moved from one position to another, without excessive generation of vibration or resonance in the arm 35. This provides a more stable camera support.

Figure 14:
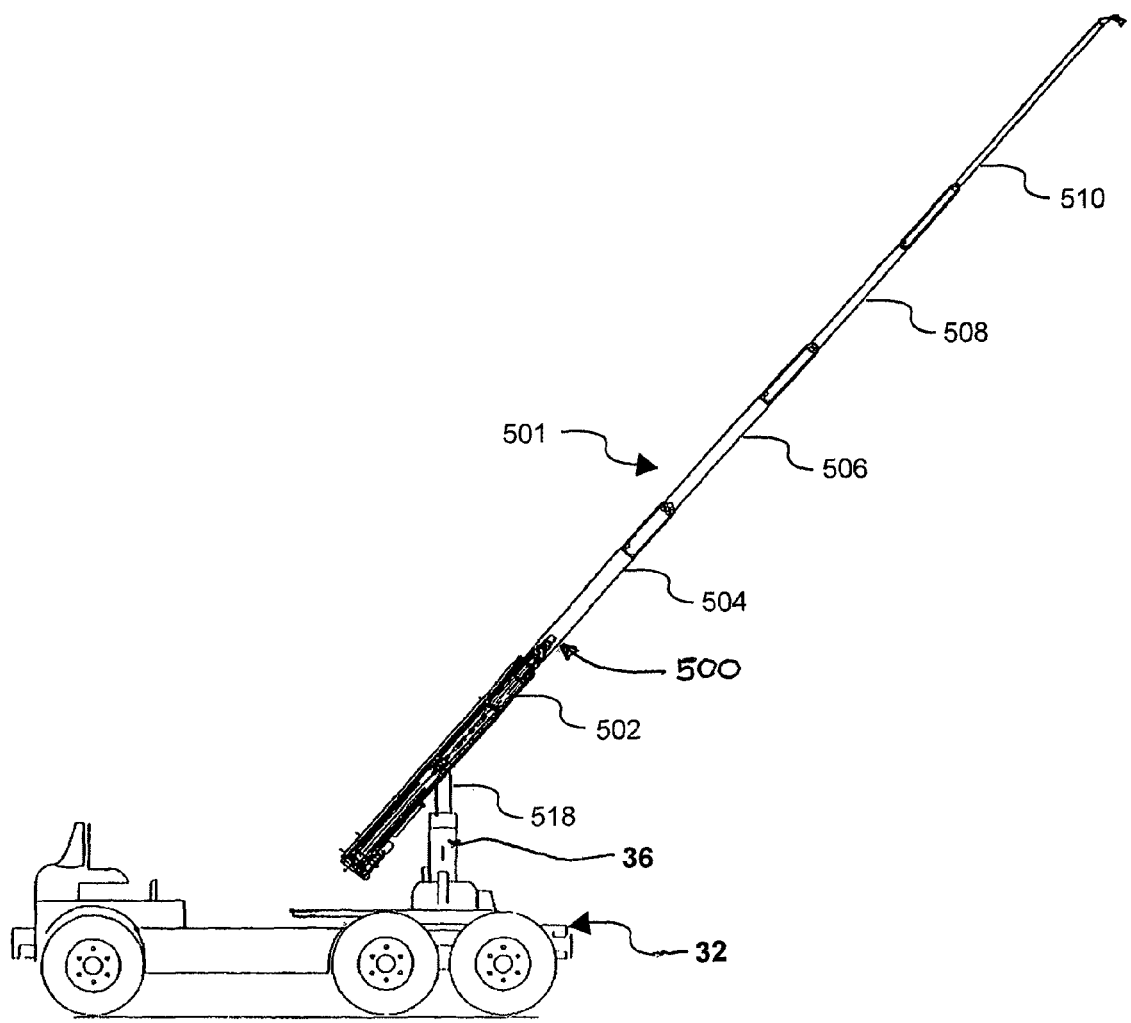
FIG. 14 is a side view of another camera crane arm design.
Figure 15:
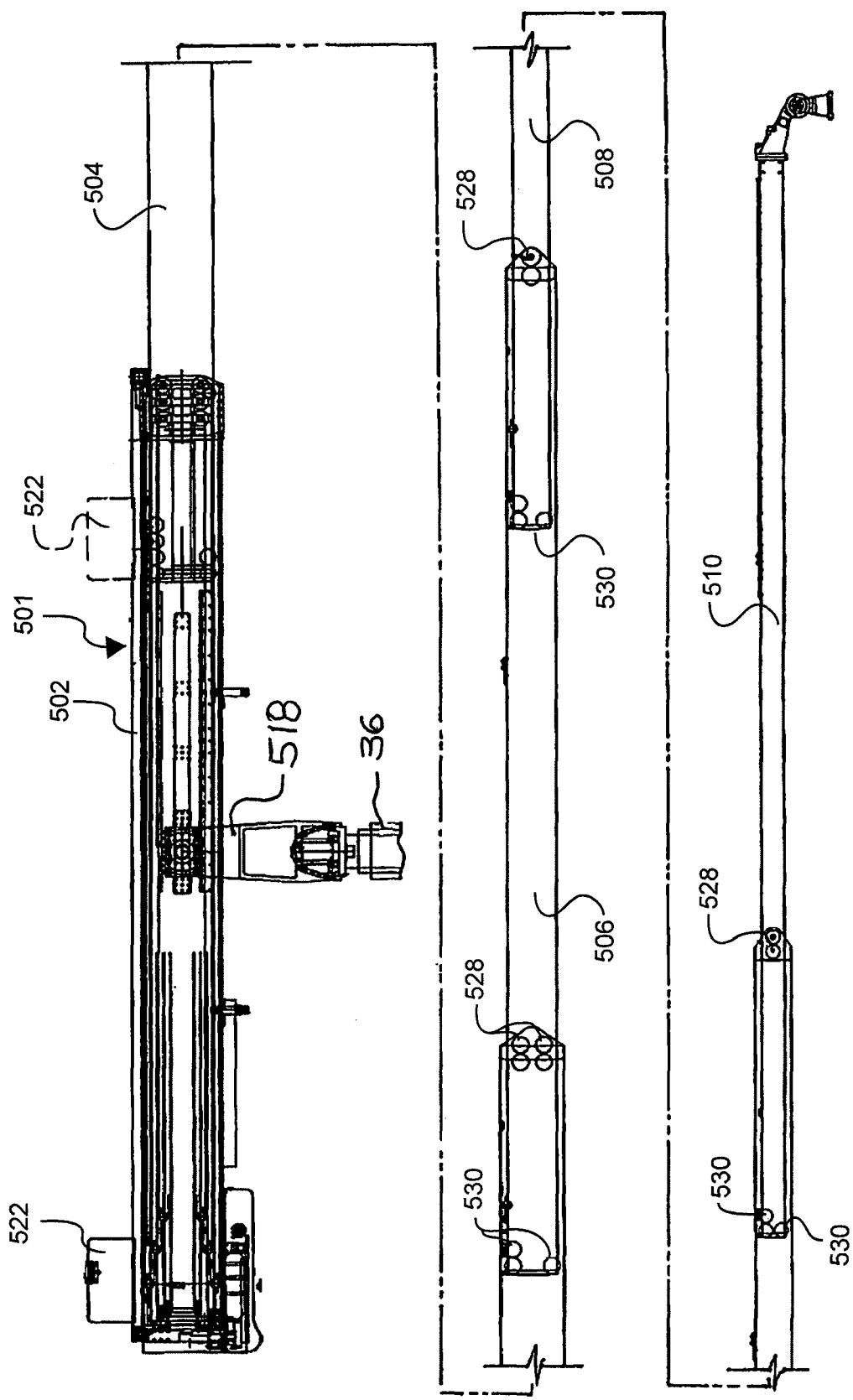
FIG. 15 is a side view of the crane shown in FIG. 14 in a horizontal and extended position.

FIGS. 14-26 show a new crane arm design 501 which can achieve unprecedented heights. As shown in FIGS. 14 and 15, the crane arm 501 has a first tube or section 502 pivotably supported on a U-frame 518. A second section 504 is telescopically supported in the first section, a third section 506 is telescopically supported in the second section 504, a fourth section 508 is telescopically supported in the third section 506 and a fifth section 510 is telescopically supported in the fourth section 508.

FIGS. 14 and 15 show the crane arm 501 extended while FIGS. 16 and 17 show the crane arm retracted. As shown in FIG. 17, side bars 512 may be attached to the first tube 502 via lateral bars 514. The side bars 512 provide a convenient grasping surface, to allow crane operators to manually maneuver the crane arm 501.

Figure 19:
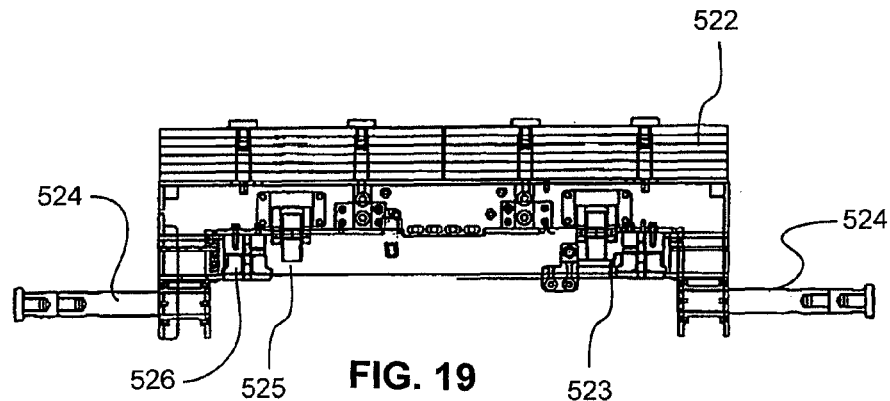
FIG. 19 is a front view of the counterweight tray shown in FIG. 18, without the counterweights.
Figure 18:
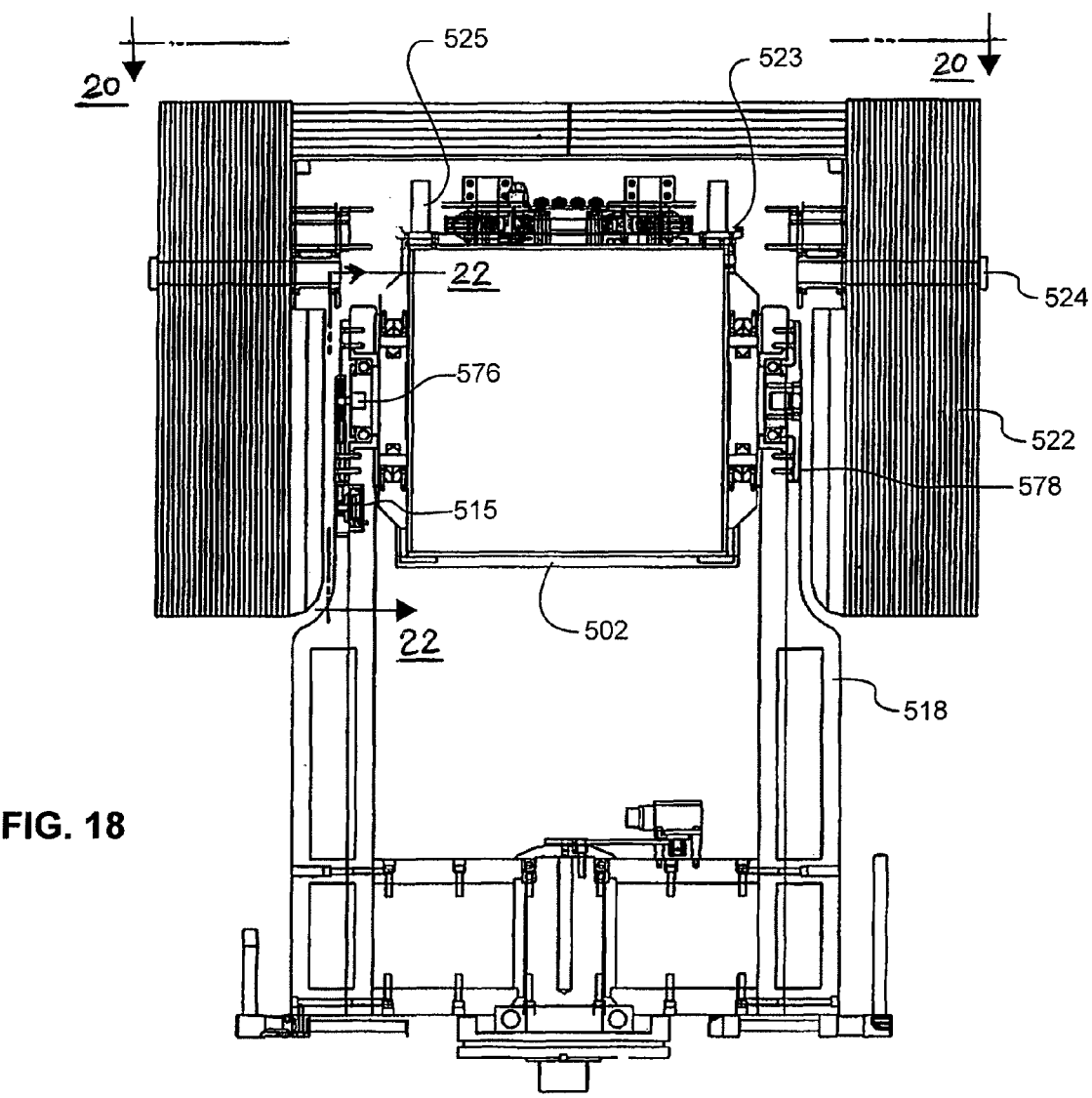
FIG. 18 is a view taken along line 18-18 of FIG. 16.
Figure 20:
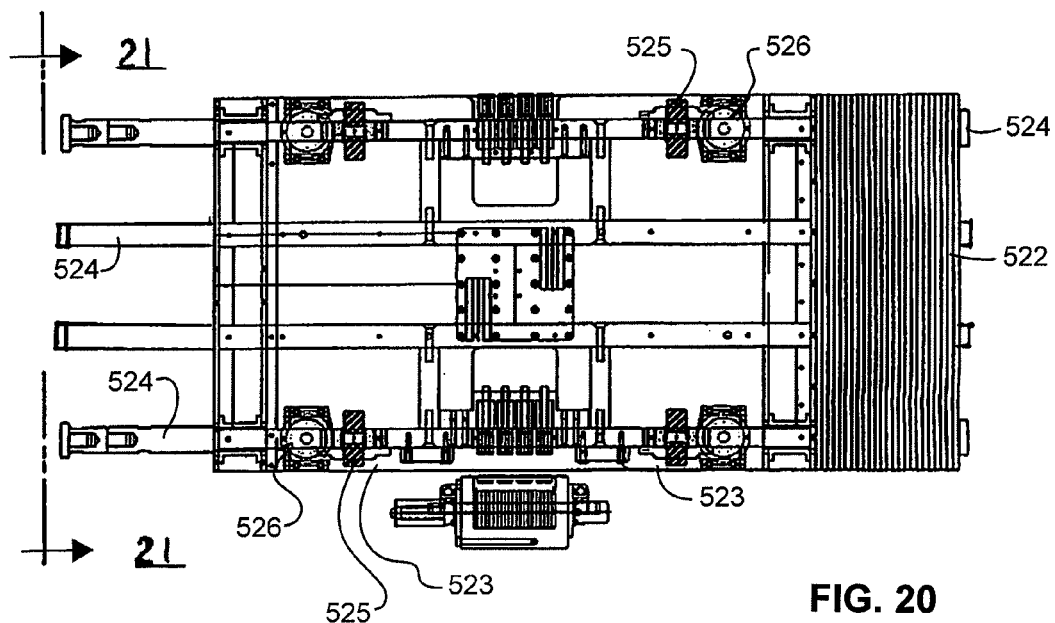
FIG. 20 is a view taken along line 20-20 of FIG. 18.
Figure 21:
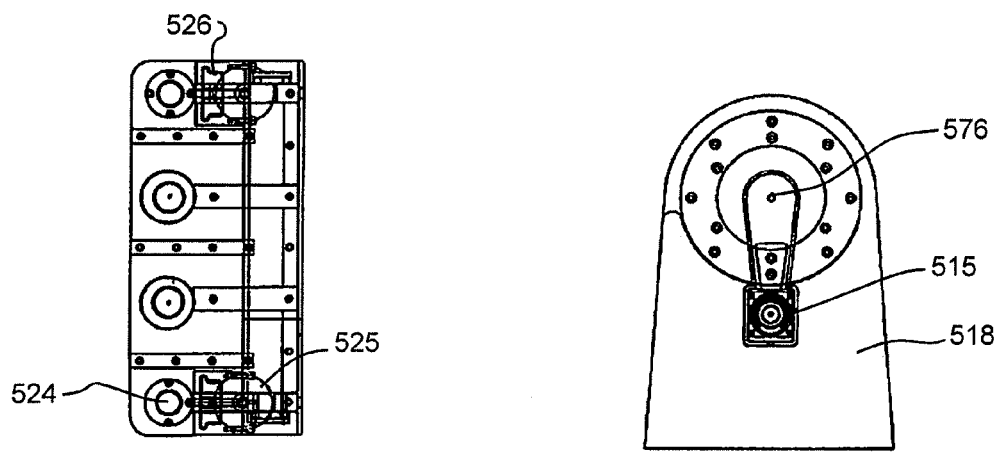
FIG. 21 is a side view taken along line 21-21 of FIG. 20.
Figure 22:
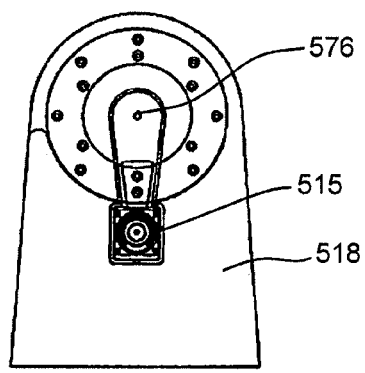
FIG. 22 is a side view taken along line 22-22 of FIG. 18.
Figure 23:
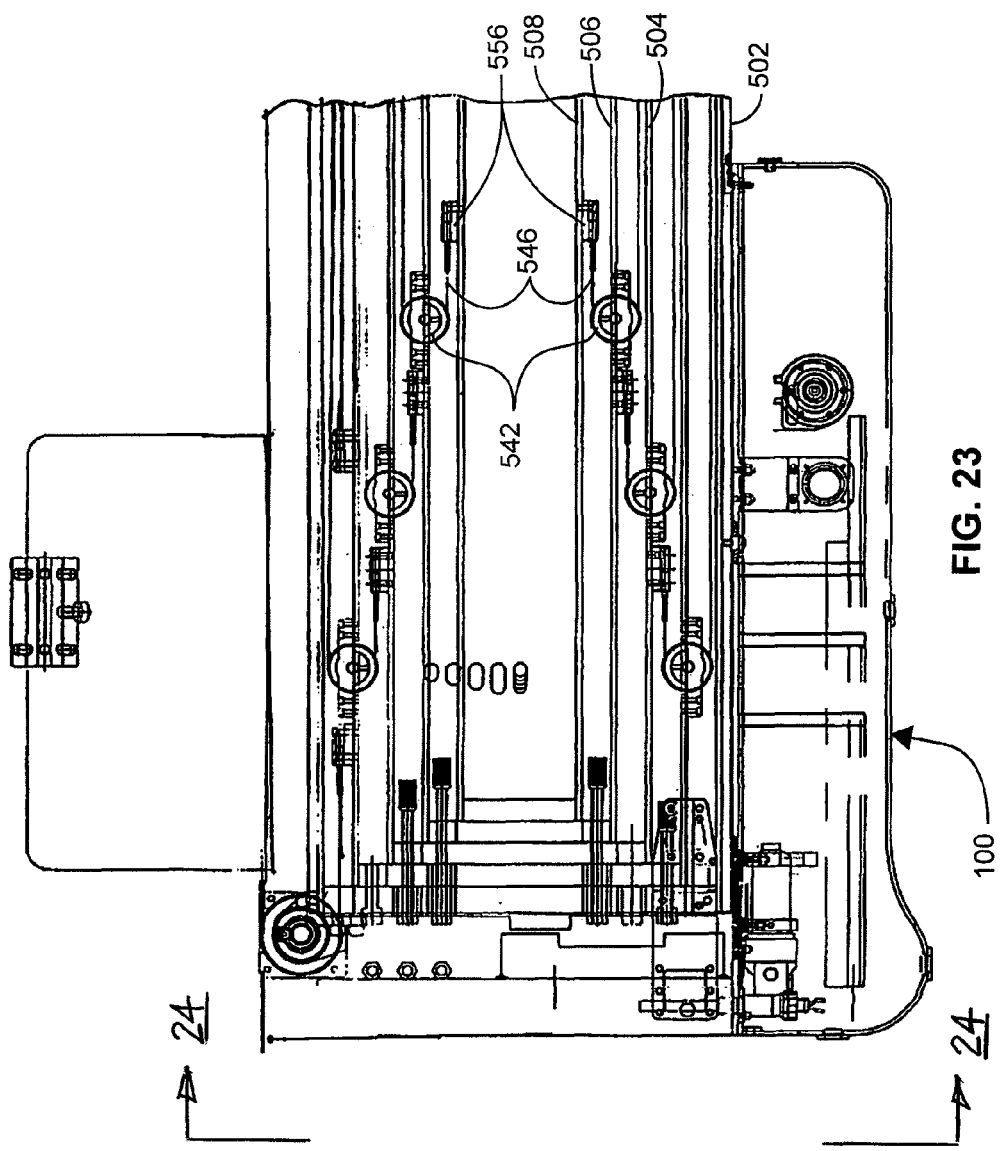
FIG. 23 is an enlarged side view, in part section, of the back end of the crane shown in FIGS. 14 and 15.

The crane arm 501 has a counter weight carrier 520 similar to the counter weight carrier 50 in the telescoping crane 30 shown in FIGS. 1-3. FIG. 16 shows the counter weight carrier 522 in its forward most position, with the crane 500 fully retracted. FIG. 15 shows the counter weight carrier 522 in its rear most position, with the crane arm 501 fully extended. Turning to FIGS. 18 and 19, individual counterweight plates 522 are secured to the counterweight tray 520 on plate holders 524. A pair of spaced apart counter weight tracks 523 are attached to the top surface of the first tube 502. Vertical rollers 525 support the counterweight tray 520 in the vertical axis and allow the counterweight tray 520 to smoothly roll forward and aft along the top surface of the first tube 502, with minimum resistance. Horizontal rollers 526, shown in FIG. 19, roll along the side surfaces of the counterweight tracks 523, to maintain the vertical rollers in alignment on the tracks 523

Figure 24A:
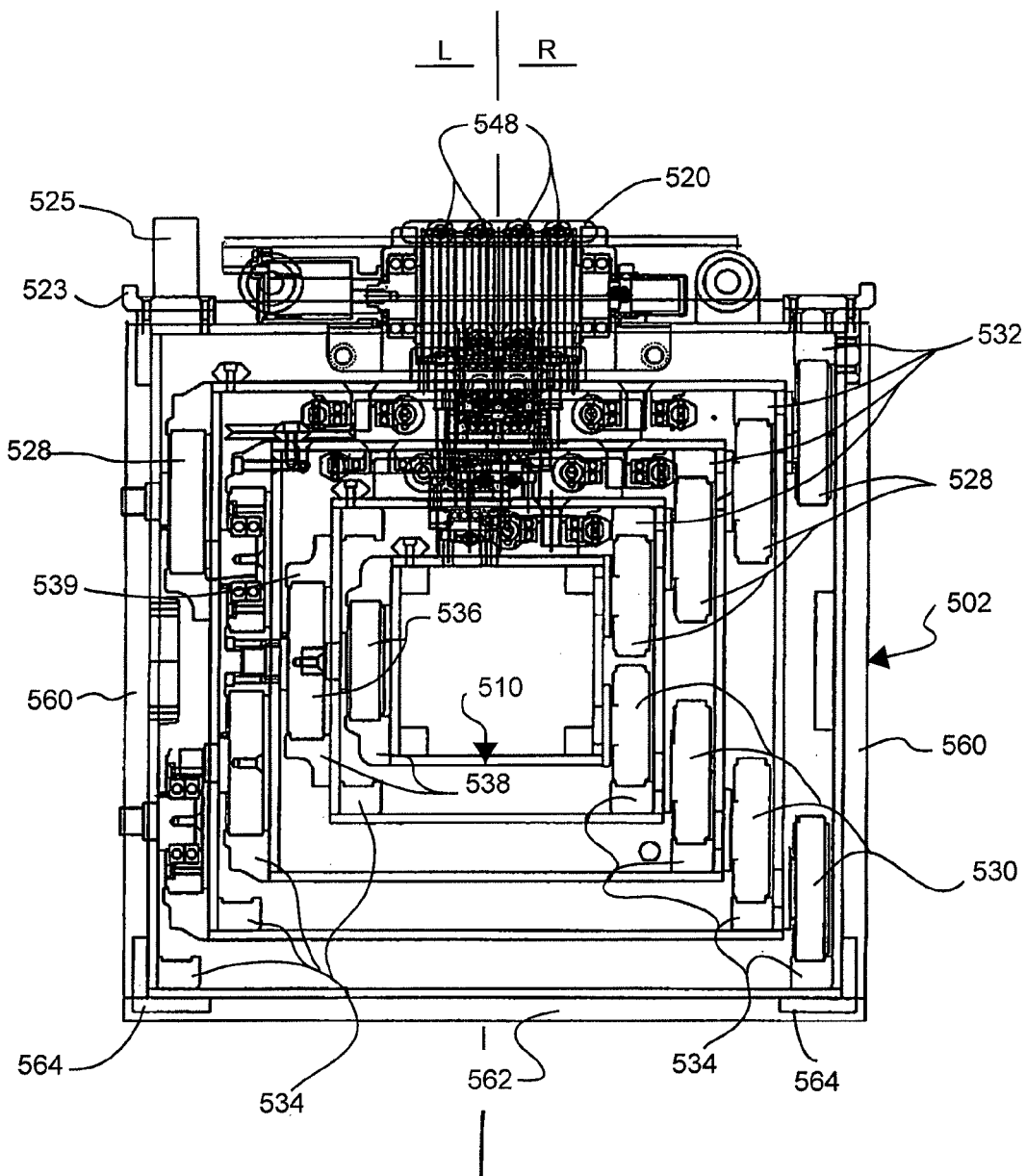
FIG. 24A is a split front view with various components removed or omitted for clarity of illustration.
Figure 24B:
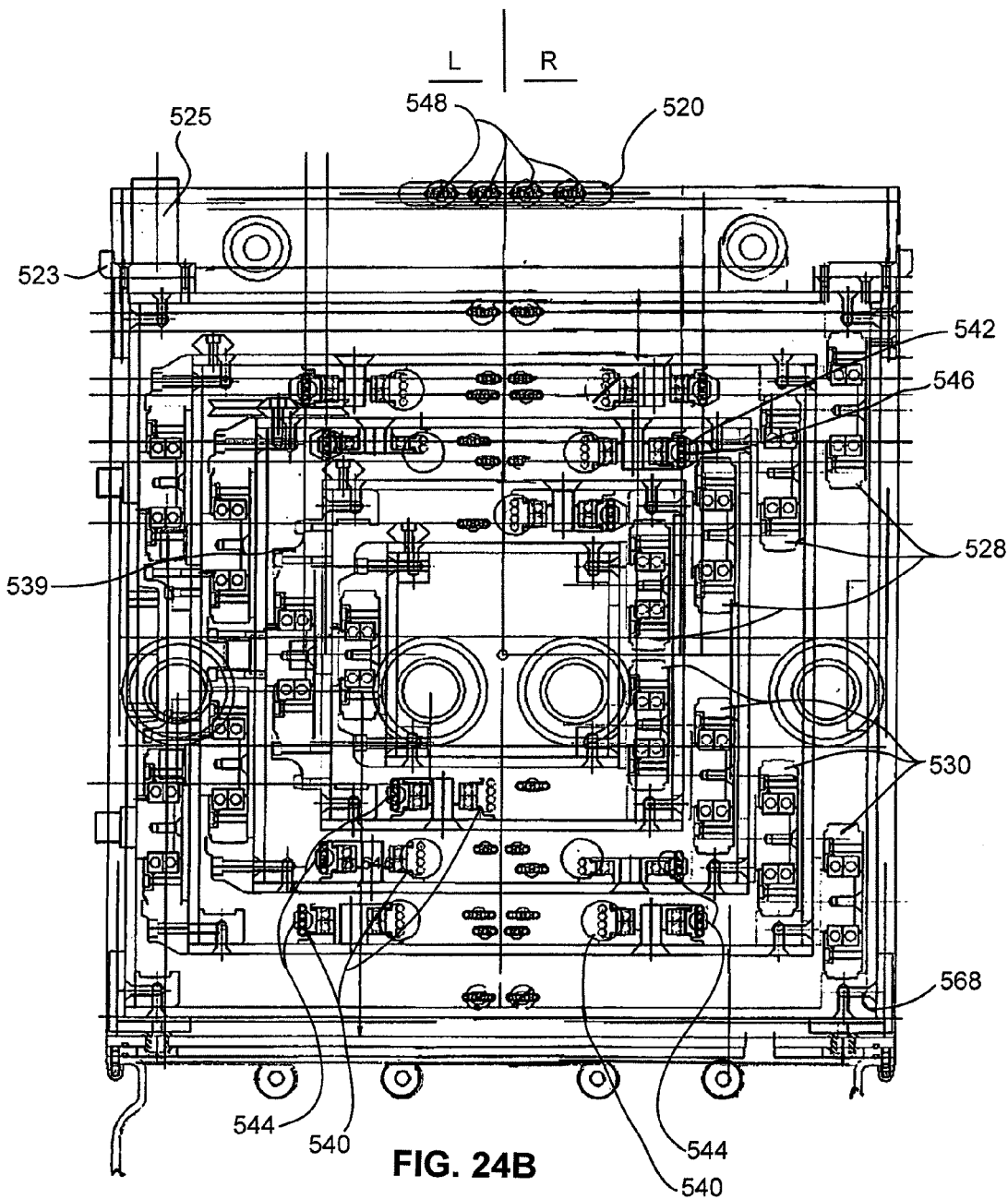
FIG. 24B is another front view with additional components shown.

Turning to FIGS. 24A and 24B, in the design shown, the first tube 502 may be near square with an approximately 18 inch width or height. The fifth or innermost tube 510 may correspondingly also be near square with a height or width of about 5.62 inches, in the design shown. The tubes 502-510 may advantageously be made from aluminum plates attached together to form the tube sections. In the design shown, the plates may be 0.25 inches thick aluminum plates. The plates may be bolted together at the corners. Highly rigid tubes may be manufactured by bolting the plates together using ¼ inch cap screws on 1 inch centers. In addition, an adhesive such as Loctite adhesive may be applied in the joints between the plates. This further prevents even small amounts of movement between the plates when the arm 501 is loaded. Consequently, load induced noises (typically creaking, popping, etc.) are reduced or avoided.

Figure 26:
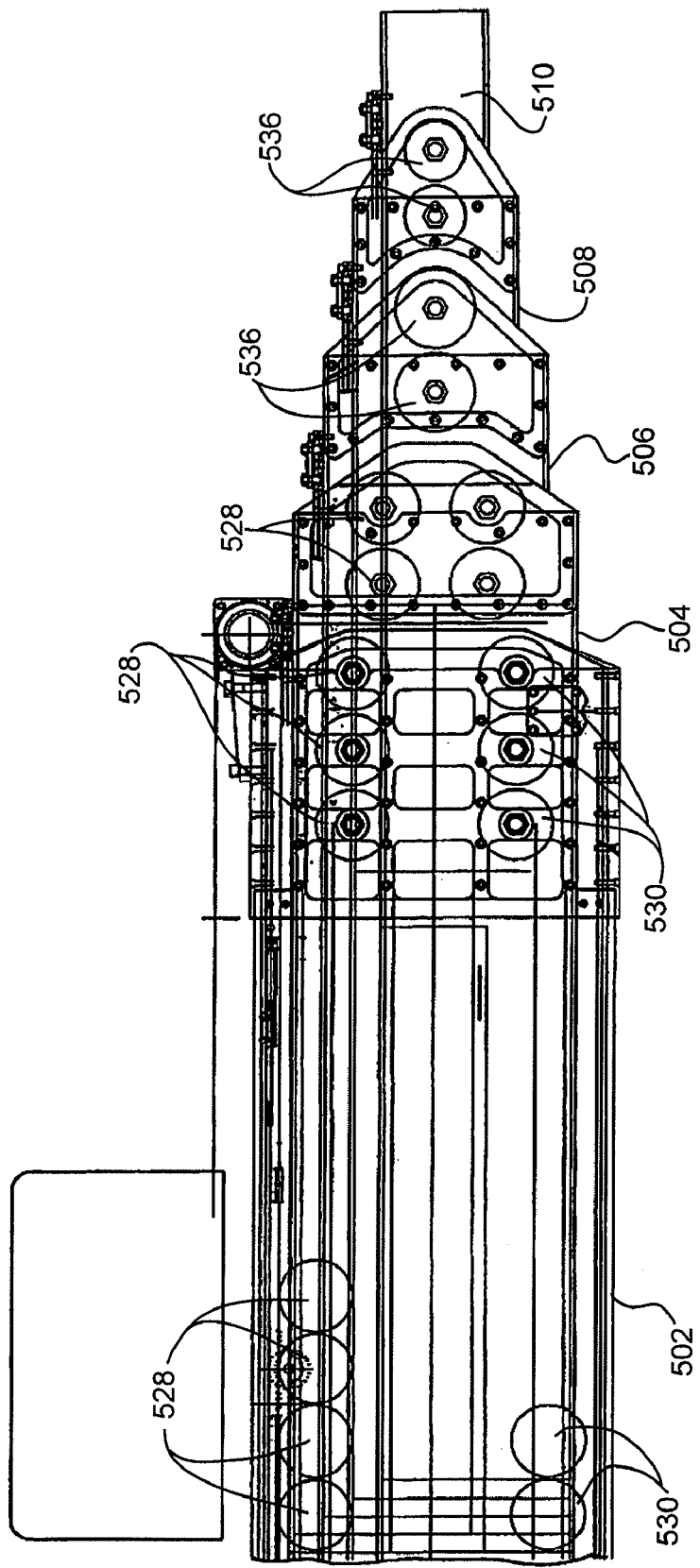
FIG. 26 is a side view of the front end of the crane, in a retracted position.

As shown in FIGS. 24A, 24B, and 26, the tube sections 504-510 are telescopically positioned within each other on rollers. As shown in FIG. 26, the second tube 504 is supported within the first tube 502 via upper and lower rollers 528 and 530, adjacent to the front and back ends of the second tube 502. The third, fourth, and fifth tubes 506-510 are similarly supported on upper and lower rollers 528 and 530. The upper and lower rear rollers 528 and 530 roll on upper and lower rear roller tracks 532 and 534. The tracks 532 and 534 may be located at the corners of the tubes 504-510 to additionally serve as attachment points for the plates 560 and 562 forming the tubes. Front rollers 536 rolling on upper and lower front roller tracks 539 and 538, support the front ends of the telescoping tubes 504-510.

In the specific design shown in FIG. 26, six upper rollers 528 (three on each side) and six lower rollers 530 (also three on each side) are rotatably attached to an inner side wall of the first tube 502, at the front end of the first tube 502, to telescopically support the second tube 504. These front rollers roll in or on tracks 532 and 534 attached to an outer sidewall of the second tube 504. Multiple rollers are used at the front end of the tube as the front end of the each tube carries the most load. Also as shown in FIG. 26, rear rollers are rotatably attached to an outer side wall of the second tube 504, near the rear end of the second tube 504, and roll on or in tracks attached to an inner side wall of the first tube 502. This same roller placement is also used to telescopically support the other tube sections as well. However, as shown in FIG. 26, fewer rollers may be used with smaller tubes, as the loads on them in use is less than on the larger tubes. For example, as shown in FIG. 26, the first tube 502 may have three top and bottom rollers at the front end (on each side, for a total of 12 front rollers). The second tube 504 may two top and bottom rollers at the front end (on each side, for a total of eight front rollers). The third and fourth tubes may have one top roller and one bottom roller at the front end (on each side, for a total of four front rollers). This is shown on the left side L of FIGS. 24A and 24B.

Referring to FIG. 26, at the rear end of the second tube 504, four top rollers 528 and two bottom rollers 530 are rotatably attached (on each side) to an outer sidewall of the second tube 504. The third, fourth and fifth tubes carry less load at the rear of the tube and accordingly may fewer rear rollers. As shown on the right side R of FIGS. 24A and 24B, these tubes have two rear top rollers 528 and one rear bottom roller 530 (on each side). The rear bottom rollers are typically only loaded when the crane arm is substantially retracted. The arm 501 is symmetrical from side to side relative to the rollers 528 and 530.

The rollers maybe be made of Torlon (polyamide-imide), a material that does not absorb water and is highly stable, so that the rollers do not develop flat spots. The rollers 528 and 530 may be about 4 inches in diameter and undergo up to 0.008 inch of compression under loading, to better absorb vibration and reduce noise. Access openings may be provided in the tubes further allow for inspection, maintenance or replacement of the rollers.

In the specific example shown, the tubes 504-510 are each 20 feet long, with about 15 feet of telescopic extension. As a result, the crane arm 501 can provide up to about 60 feet of telescopic movement. The counterweight tray 520 may be connected via cables and pulleys to hydraulic actuators, as shown in FIG. 13, but with a 2:1 movement ratio. As a result, 7½ feet of piston movement causes the counterweight carrier 520 to move 15 feet. This causes the tubes 504-510 to each individually also move by about 15 feet, providing collective telescoping extension movement of about 60 feet.

The amount of overlap between adjacent tubes with the arm fully extended may vary. For example, the overlap between the first and second tubes, with the arm fully extended, may be 48 inches, while the overlap between the second and third tubes is 55 inches. In this example then, the overlap between the third and fourth tubes would be 63 inches, and the overlap between the fourth and fifth tubes would be 70 inches. This increasing amount of overlap from the first to the fourth tube is shown in FIGS. 14 and 15.

The tubes 502-510 may be provided with a slight upward curvature as described above relative to the crane arm 35 shown in FIGS. 1-11. The curvature is typically about a 40,000-60,000 inch diameter (resulting in a dip of about ¼ inch at the center point of a 20 foot tube). Each of the tubes 502-510 may be provided with the same amount of upward curvature, so that the tubes fit smoothly together, and so that the crane arm 501 is nearly straight under nominal conditions, with little or no sagging. The tubes 502-510 may be open at the ends, to allow for inspection of rollers, pulleys, and other components.

The crane arm 501 may use a drive system similar to the system described above relative to FIGS. 1-13. Due to the greater size, length, weight, and loads involved in the crane arm 501, additional cables and pulleys may be used. However, the principals of operation are similar to those illustrated in FIGS. 9-13. The drive system as shown in FIG. 13 for example, may be duplicated to provide for redundancy.

As shown in FIGS. 24A and 24B, sixteen counter weight carrier cables 548 connect the counter weight carrier 520 to the second tube 504. In a manner similar to the design shown in FIG. 10, extension pulleys 540 are attached near the front ends of the second, third, and fourth tubes or sections 504-508. Eight extension cables 544 extend from a fixed anchor 552 at the back end of the first section 502 around the extension pulleys 540 and attach to a tie point near the back end of the third tube 506. A similar design is used between the third and fourth tubes 506 and 508, and between the fourth and fifth tubes 508 and 510.

The drive system for extending and retracting the arm 501 also includes retraction cables 546 extending around retraction pulleys 542 located near the back ends of the tubes 506-510, using the same principal of operation as shown in FIG. 10. Again, however, as with the extension cables 544, multiple retraction cables 546 may be used to better handle the loads, and also to reduce strain and stretching of the cables. In the design shown, eight retraction cables 546 are used between the second tube 504 and the third tube 506. Each retraction cable 546 between the second tube 504 and the third tube 506 has a first end attached to an inside wall near the front end of the second tube 504, with the retraction cable 546 extending rearwardly around a retraction pulley 542 near the back end of the third tube 506. The retraction cable 546 passes through an opening in the third tube 506 and is then attached at an anchor point on an inside surface near the back end of the third tube 506, similar to the cable 158 shown in FIG. 11.

In the design shown, four retraction cables 546 are provided at the top of the third tube 506 and an additional four retraction cables 546 are provided at the bottom of the third tube 506. Similar retraction cables and retraction pulleys are used between the third tube 506 and the fourth tube 508, and between the fourth tube 508 and the fifth tube 510. Accordingly, each retraction pulley 542 (as well as each extension pulley 540) may be adapted with four cable groups, to accommodate four cables on a single pulley.

Figure 25:
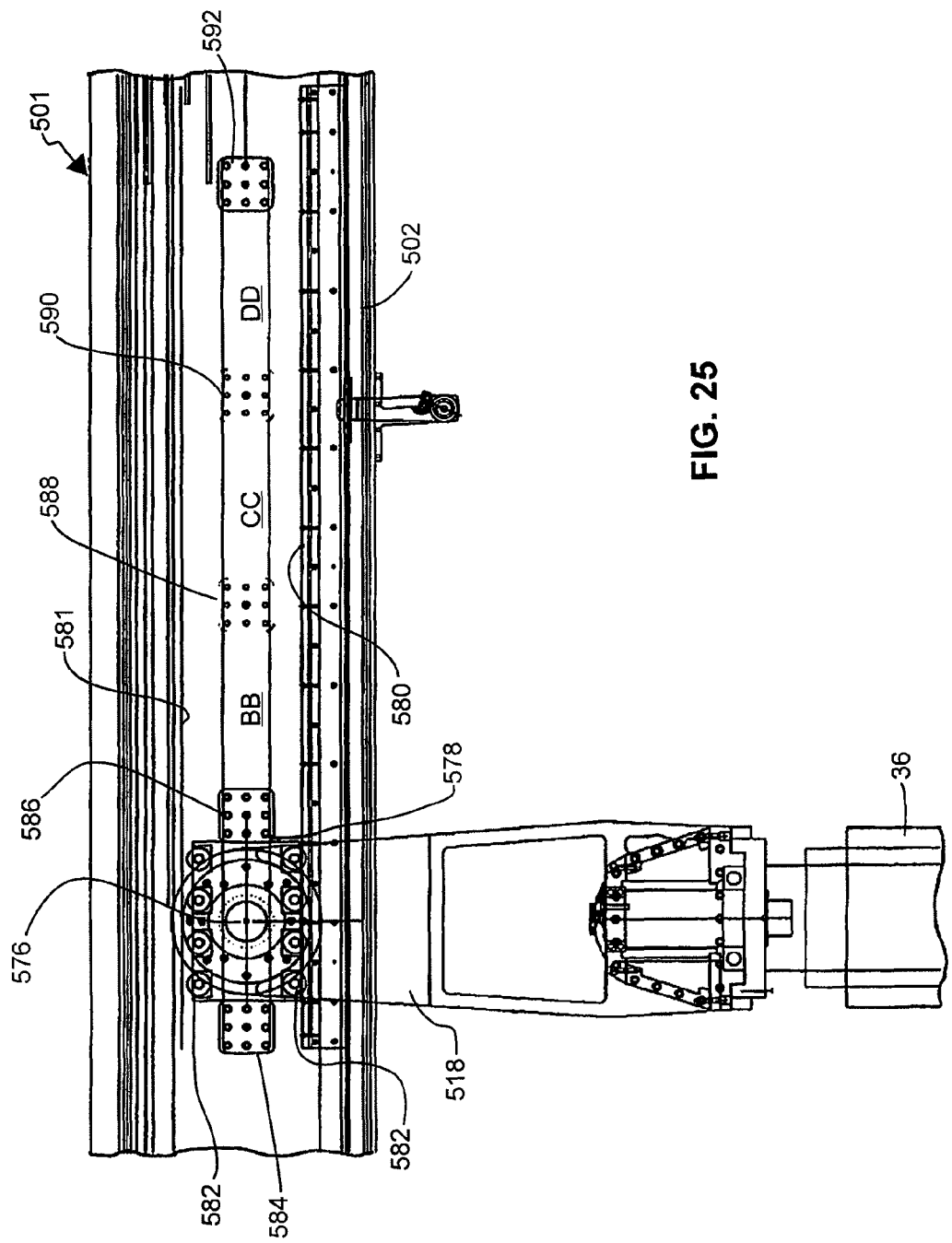
FIG. 25 is a side view of a central area of the first section of the crane shown in FIGS. 14 and 15.

Turning to FIGS. 18, 25 and 33, the arm 501 is attached to the U-frame 518 via bearings and axle stubs 576. As shown in FIG. 18, the axle stubs 576 are attached to the U-frame 518 on each side via axle plates 578. The axle plates 578 are bolted onto each side of the first tube 502. Specifically, hole patterns at each end of each axle plate 578 align with hole patterns 584 and 586 on the sides of the first tube 502.

Additional identical hole patterns 588, 590, and 592 are spaced apart from the second hold pattern 586 by equal increments. Upper and lower rows of U-frame or support rollers 582 are provided on each side of the U-frame 518. An upper roller track 581 and a lower roller track 580 are attached to the side 502 between the first hole pattern 584 and the fifth hole pattern 592, shown in FIG. 25. The rollers 582 may be V-groove rollers which fit into a corresponding V-groove slot formed by hardened surfaces of the upper and lower tracks 581 and 580.

This design allows the pivot axis of the crane arm 501 to be shifted in the front-back direction. FIG. 25 shows the crane arm 501 with the pivot axis (which is co-axial with the axle stubs 576) in the rear most position. This set-up results in a minimal length of the crane arm 501 extending behind the pivot axis 576. A result, less clearance space is required behind the column 36 for maneuvering the crane arm 501. On the other hand, however, additional counterweights are needed to maintain the crane arm 501 in balance. In addition, with the set up as shown in FIG. 25, the crane arm 501 has a maximum amount of forward reach from the column 36.

Referring still to FIG. 25, the location of the pivot axis 576 can be changed by removing the bolts from the axle plates 578. The crane arm 501 is then temporarily supported via the upper track 581 resting on top of the upper row of U-frame rollers 582. The lower rollers 582 and rail 580 hold the arm 501 into contact with all of the upper rollers, regardless of the front/back balance condition of the arm. The arm 501 can then be shifted rearwardly relative to the U-frame 518 by manually pushing and/or pulling on the arm 501. The arm may be pushed rearwardly until the holes in the axle plate 578 are moved into alignment with the next sequential hole pattern in the sides of the first tube or section 502 of the arm 501.

In the design example shown, this allows the arm 501 to be moved into four alternative positions: the position as shown in FIG. 25, or to the positions indicated at BB, CC, or DD, which are each spaced apart by 16 inches. The arm may be angled upwardly for gravity assist in moving the arm 501 from the position shown in FIG. 25 into positions BB, CC, or DD. Once the arm 501 is moved into the desired position, the axle plates 578 are again bolted onto the first tube 502.

Figure 28:
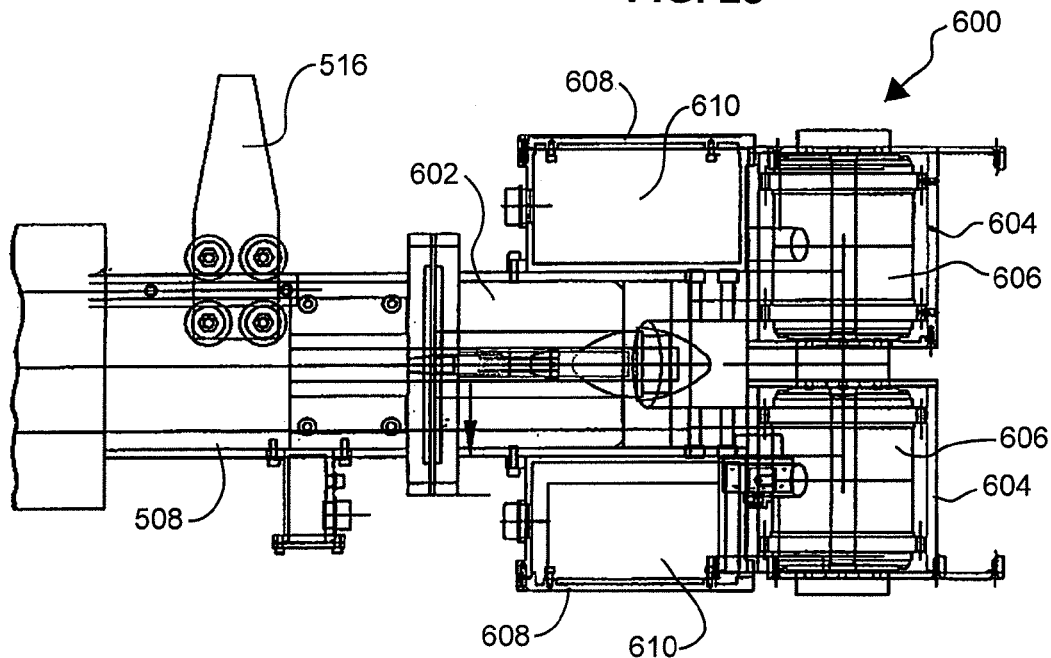
FIG. 28 is a top view of the nose assembly shown in FIG. 27.
Figure 27:
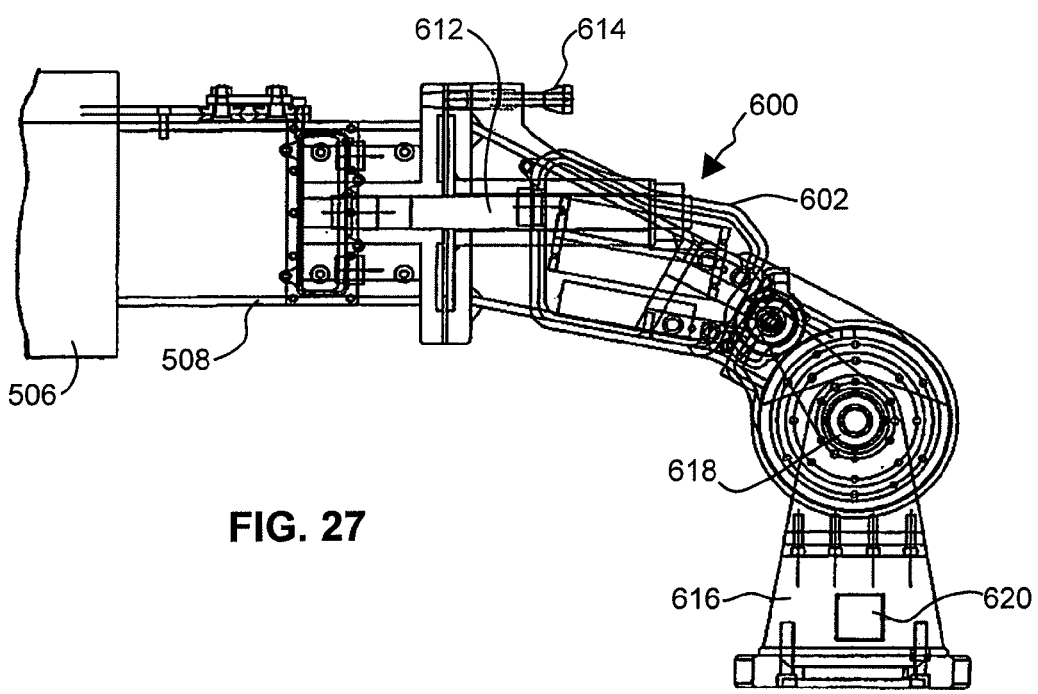
FIG. 27 is a side view of a nose assembly attached to the front end of the crane.

Turning to FIGS. 27 and 28, a nose assembly 600 may be attached to the front end of the fifth tube 510 (or to the third tube 56 in the embodiment shown in FIGS. 1-13). The nose assembly 600 provides for automatic leveling. The nose assembly 600 includes a declined angle leg 602 which extends downwardly at an angle from the fifth tube 508. The leg 602 may be pivotably attached to the arm 501 (about a roll axis) via a pivot axle 612. A quick release pin 614 may be used to secure the leg 602 into an under slung position (as shown in FIG. 27), into an over slung position as shown in FIG. 7, or into other roll angle positions. Housings 608 containing amplifiers 610 and other components, may be attached to the sides of the leg 602. Motors 606 are contained within sealed motor housing 604 and are geared to the head axle 618 of a camera head 616 (or other camera support structure). The motor housings 604 may be sealed and filled with an inert gas, such as nitrogen under positive pressure.

In the design shown, harmonic drive motors 606 are used. The harmonic drive motors 606 have zero backlash. In the nominal position, the head 616 remains level via gravity alone, as shown in FIG. 27. Consequently, the motors 606 do not require continuous electrical current to keep the head level. Rather, the motors are actuated only when and out of level condition is detected. As the head 616 moves out of level (due to extension/retraction movement of the crane arm 501, acceleration of the mobile base, change of elevation angle of the crane arm 501, or due to other factors, such as wind) the leveling system detects the out of level condition and energizes the motors 606 applying torque to bring the head 616 back to a level position. Since the harmonic drive motors 606 have no backlash, no electrical current is needed to avoid backlash. Consequently, battery power is conserved. The harmonic drive motors 606 may be 24 volt DC motors. This avoids various safety considerations associated with use of higher voltages.

A potentiometer or other position sensor 620 may be provided on the head 616. The sensor 620, which senses the position of the head 616, and the potentiometer or sensor 515, which senses the angle of elevation of the arm 501, may both be linked to an electronic controller. When the arm 501 is angled up or down (change in elevation angle), the electronic controller can detect differences in the sensor singles indicating that the head 616 is out of level. The electronic controller 275 can then correspondingly control the motors 606 to correct the position of the head 616 back to level. The leveling system corresponding includes the position sensor 620, the controller 275, and related electronics (e.g., power supplies) for powering the motors 606. Additional sensors, such as the elevation angle sensor 515, may also be included.

Figure 29:
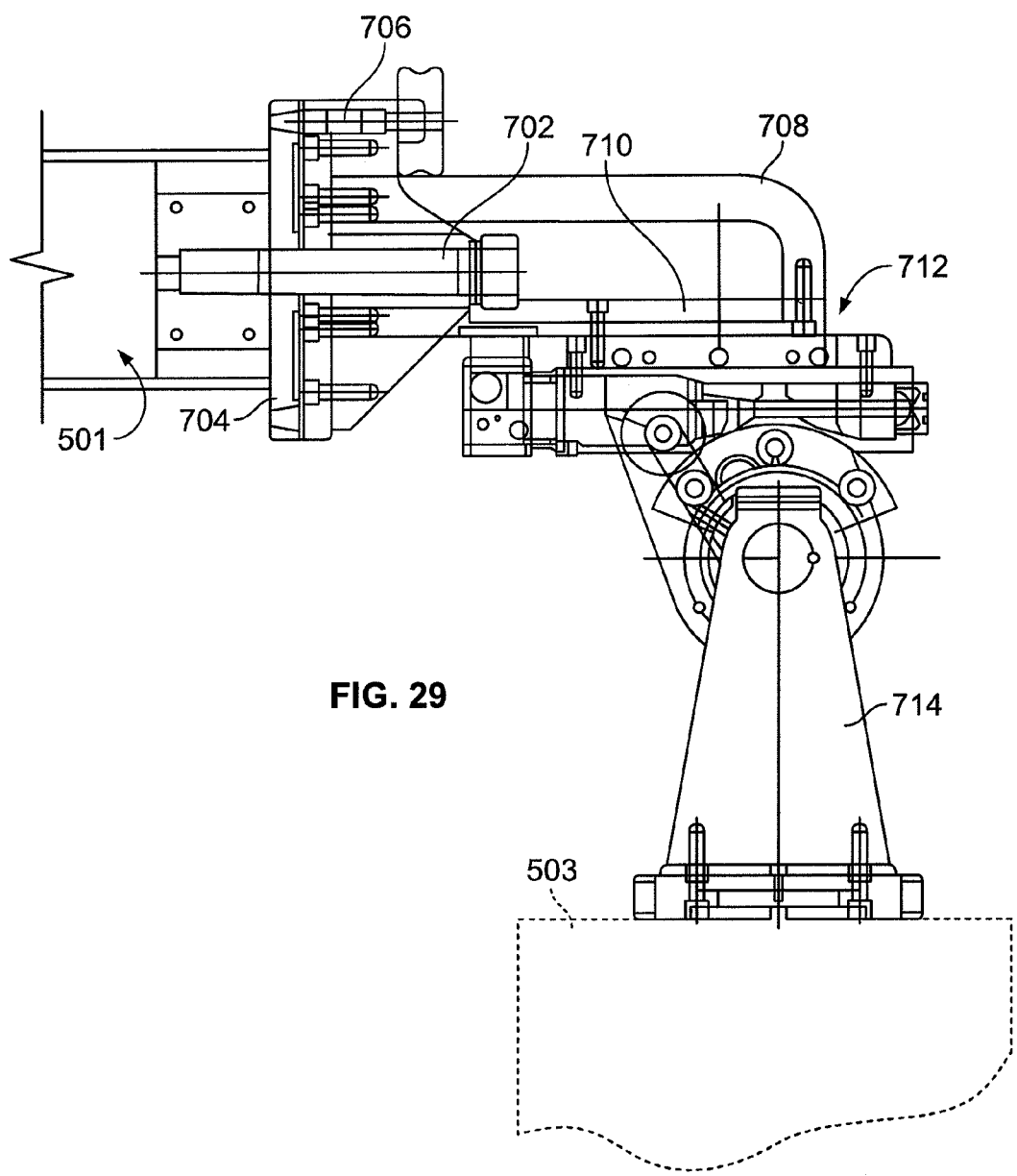
FIG. 29 is a side view of an alternative nose assembly design.
Figure 30:
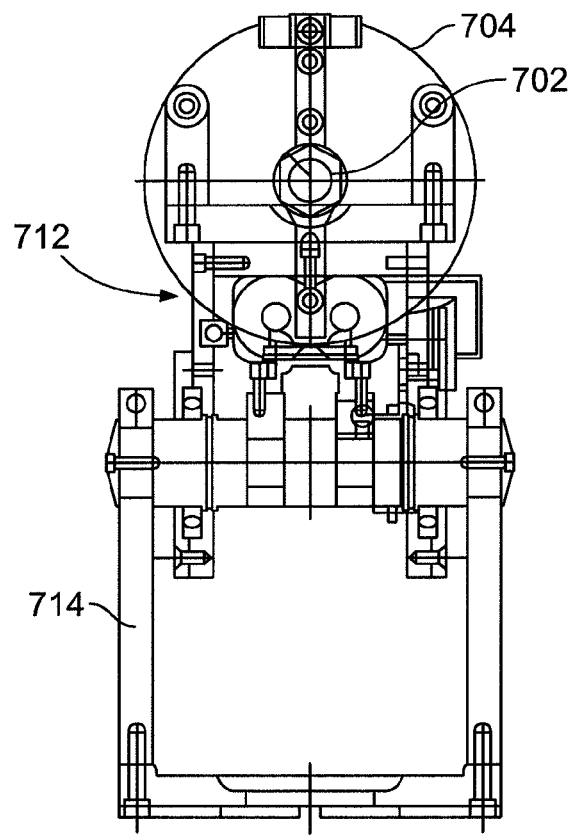
FIG. 30 is a front view of the nose assembly shown in FIG. 29.
Figure 31:
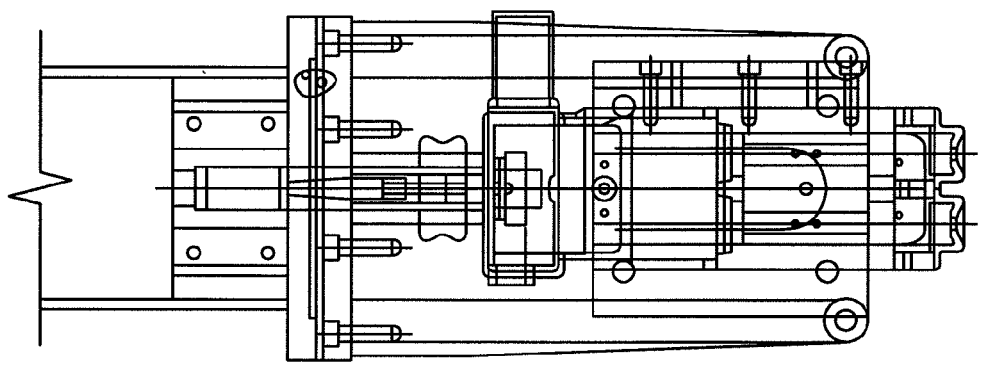
FIG. 31 is a top view of the nose assembly shown in FIG. 29.

FIGS. 29-31 show an alternative nose assembly 700 attached to the end of the crane arm 501. A center plate 704 of the nose assembly 700 is secured onto the end of the crane arm 501 (or 35) via a center bolt 702. A quick release pin 706 aligns the nose assembly 700 vertically, in an under slung position as shown in FIG. 29. The nose assembly 700 may be moved to an over slung or side slung position by loosening the center bolt 702, temporarily pulling back on the pin 706, and then turning the nose assembly until the pin 706 aligns with another locating hole in the end of the arm. The pin 706 is then released and is spring biased outwardly to re-engage into the end of the arm. The center bolt 702 may then be retightened. The pin 706 precisely angularly aligns the nose assembly 700, while also allowing for quick changeover between nose assembly positions.

Referring to FIGS. 29-31, handles 707 and a base plate 710 are joined to the center plate 704. A dual motor dynamic leveling system 712 is supported on the base plate 710, as described in U.S. patent application Ser. No. 11/836,509, incorporated herein by reference. The leveling system 712 dynamically acts to maintain the camera support frame 714 level.

A fixed length extension boom of up to about 20 feet (depending on the pay load) may be attached to the end of the fifth tube 510, to extend the total reach of the crane arm 501 to 90 feet. A typical maximum payload for the crane arm as shown in FIGS. 14-26 would be about 230 pounds. With the arm extended to 90 feet, a typical maximum payload would be reduced to about 115 pounds.

U.S. patent application Ser. Nos. 11/835,509 and 11/555,124, and U.S. Pat. No. 7,128,479 are incorporated herein by reference.

Thus, a novel camera crane has been shown and described. Changes and substitution may of course be made without departing from the spirit and scope of the invention. The invention, therefore, should not be limited, except to the following claims and their equivalents.

The invention claimed is:

1. A camera crane comprising:
   an arm having a first section, a second section telescopically extendible into and out of the first section, and a third section telescopically extendible into and out of the second section;
   a camera platform at a front end of the third section;
   a counterweight movable along the first section;
   the first section having a longitudinal axis and first side and a second side, with first and second attachment elements, on each of the first and second sides, spaced apart from each other along the longitudinal axis of the first section,
   an arm support, and a pivot joint for attaching the first section of the arm to the arm support at a first position using the first attachment elements, and with the first section attachable to the arm support at a second position using the second attachment elements, to allow the arm to shift position in a longitudinal direction relative to the arm support.

2. The camera crane of claim 1 with the first and second attachment elements comprising first and second hole patterns spaced apart along each of the first and second sides of the first section, and first and second axle plates on the arm support alignable with each of the first and second hole patterns, respectively, by sliding the arm in a front/back direction relative to the arm support.

3. The camera crane of claim 1 further comprising side rails on the sides of the first section, and a plurality of rollers on the arm support engageable with the side rails, to allow the arm to move on the rollers in a longitudinal direction, to change the relative position of the arm on the arm support.

4. The camera crane of claim 1 with the arm support comprising a U-frame pivotably attached to a mobile base wheeled vehicle.

5. The camera crane of claim 1 wherein the first, second and third sections comprise substantially square tubes.

6. The camera crane of claim 1 with the sections comprising tubes formed from plates bolted and adhered together.

7. The camera crane of claim 1 with the sections comprising quadrilateral tubes, and further comprising roller guides attached at inside corners of the tubes.

8. A camera crane comprising:
   a first tube;
   a second tube telescopically extendible from the first tube;
   a third tube telescopically extendible from the second tube;
   a fourth tube telescopically extendible from the third tube;
   a fifth tube telescopically extendible from the fourth tube;
   with the tubes formed from plates bolted and adhered together;
   a cable and pulley system associated with the first, second, third, fourth and fifth tubes, for telescopically extending and retracting the tubes;
   a counter weight carrier movable along the first tube and linked to the cable and pulley system;
   a hydraulic drive system connected to the counter weight carrier; and
   a camera platform pivotally connected to a front end of the fifth tube.

9. The camera crane of claim 8 with substantially each of the tubes having a radius of curvature ranging from 20,000 to 30,000 inches.

10. The camera crane of claim 8 further comprising roller guides attached at the inside corners of the first, second, third and fourth tubes.

11. The camera crane of claim 8 further comprising first and second attachment elements on first and second sides of the first tube, with the attachment elements spaced apart from each other along a longitudinal axis of the first section; and
   an arm support, with the first section pivotably attachable to the arm support at a first position using the first attachment elements, and with the first section attachable to the arm support at a second position using the second attachment elements, to allow the position of the crane arm on the arm support to be changed.

12. A telescoping crane arm, comprising:
   a back section;
   a moving counter weight on the back section;
   a front section;
   one or more intermediate sections between the back section and the front section;
   a drive system for causing the intermediate and front section to telescopically extend and retract;
   a nose assembly on the front section including:
      a declined angle leg extending downwardly at an angle from the front section;
      a head pivotally attached to the declined angle leg and;
      a leveling system on the declined angle leg, including:
         at least one sealed motor housing;
         at least one harmonic drive motor in the motor housing, with the harmonic drive motor linked to the head;
         a position sensor on the head; and
         an electronic controller linked to the position sensor and harmonic drive motor.

* * * * *